US007918646B2

(12) United States Patent
Akcasu

(10) Patent No.: US 7,918,646 B2
(45) Date of Patent: Apr. 5, 2011

(54) HIGH EFFICIENCY TURBINE WITH VARIABLE ATTACK ANGLE FOILS

(75) Inventor: Osman Ersed Akcasu, Morgan Hill, CA (US)

(73) Assignee: Lonestar Inventions LLP, Austin, TX (US)

( * ) Notice: Subject to any disclaimer, the term of this patent is extended or adjusted under 35 U.S.C. 154(b) by 874 days.

(21) Appl. No.: 11/854,311

(22) Filed: Sep. 12, 2007

(65) Prior Publication Data

US 2008/0175709 A1 Jul. 24, 2008

Related U.S. Application Data

(60) Provisional application No. 60/886,025, filed on Jan. 22, 2007.

(51) Int. Cl.
*F01D 5/14* (2006.01)

(52) U.S. Cl. .................. 416/1; 416/17; 416/37; 416/61; 416/131; 415/1; 415/4.1; 415/60

(58) Field of Classification Search ............... 415/1, 2.1, 415/3.1, 4.1, 4.2, 4.4, 48, 60, 118; 416/1, 416/17, 37, 40, 61, 111, 119, 131, 223 R; 290/43, 44, 54, 55
See application file for complete search history.

(56) References Cited

U.S. PATENT DOCUMENTS

| 3,902,072 | A | * | 8/1975 | Quinn | 290/44 |
| 4,178,126 | A | * | 12/1979 | Weed | 416/17 |
| 4,180,367 | A | * | 12/1979 | Drees | 416/119 |
| 4,247,251 | A | * | 1/1981 | Wuenscher | 416/24 |
| 4,286,922 | A | * | 9/1981 | Lew | 416/17 |
| 4,303,835 | A | * | 12/1981 | Bair | 290/55 |
| 4,368,392 | A | * | 1/1983 | Drees | 290/54 |
| 4,383,801 | A | * | 5/1983 | Pryor | 416/17 |
| 4,410,806 | A | * | 10/1983 | Brulle | 290/44 |
| 5,503,525 | A | * | 4/1996 | Brown et al. | 416/24 |
| 6,379,115 | B1 | * | 4/2002 | Hirai | 416/17 |
| 6,884,020 | B2 | * | 4/2005 | Kaare et al. | 415/1 |
| 7,004,724 | B2 | * | 2/2006 | Pierce et al. | 416/61 |

FOREIGN PATENT DOCUMENTS

| JP | 15-206849 A | 7/2003 |
| JP | 18-046306 A | 2/2006 |
| JP | 18-105117 A | 4/2006 |
| WO | 02-038954 A1 | 5/2002 |
| WO | 06-013273 A1 | 2/2006 |

* cited by examiner

Primary Examiner — Igor Kershteyn
(74) Attorney, Agent, or Firm — Aka Chan LLP

(57) ABSTRACT

A high-efficiency turbine generates energy from a fluid flow, such as wind or water currents. The turbine has a central axis with a plurality of foils rotatable about the central axis in a general paddlewheel arrangement. Each of the foils has a foil axis parallel to the length of the foil and the central axis, and is rotatable about its foil axis. During operation of the turbine, each foil assumes an attack angle to the direction of the fluid flow with the attack angle dynamically controlled about the foil axis as the foil rotates about the central axis so as to maximize the foil's moment about the central axis.

26 Claims, 19 Drawing Sheets

Optimal Attack Angles at Eight Angular Locations for NACA 0015

HIGH EFFICIENCY TURBINE WITH VARIABLE ATTACK ANGLE FOILS

CROSS-REFERENCE TO RELATED APPLICATIONS

This patent application claims priority from U.S. Provisional Patent Application No. 60/886,025, filed Jan. 22, 2007, and which is incorporated by reference for all purposes.

BACKGROUND OF THE INVENTION

The invention is relates to the field of turbine design, and especially, to a turbine having foils whose attack angles are varied by computer control for increased efficiency.

Wind and water are energy sources which are widely available, renewable and clean, and the benefits of harnessing wind and water power are manifest. In comparison with the generation of electricity by burning wood, coal, or oil, the increased utilization of wind and water power improves the environment by reducing the emissions of carbon dioxide and other undesirable pollutants which adversely affect air quality and lead to acid rain, the greenhouse effect, and global warming.

Turbines have long been used to harness these energy sources to generate power in the form of electricity or mechanical energy. New turbine designs should therefore be more efficient to provide greater amounts of electricity for a given amount of fluid flow through the turbine. With more efficient turbine designs, the cost of energy generation from wind and water sources decreases. Electricity especially becomes less expensive to generate and more available. Of course, it is desirable that such turbines should be also relatively easy to design, manufacture, install, and maintain.

Wind and water provide slow fluid flows and while the total energy in these flows is large, the "energy density" of a slow flow is small. As a result, a mechanical system should be large to efficiently generate power from these fluid flows. In addition, since the direction of winds and ocean currents can change relatively quickly, a power generation system should be able to respond to these changes rapidly and efficiently. But the requirements of a large structure and the requirements of a mechanical system which can turn or move quickly in response to directional changes are incompatible and may be difficult to achieve.

Therefore, there is a great need for improvements in the generation of power from fluid energy sources which move slowly, i.e., wind and water sources.

BRIEF SUMMARY OF THE INVENTION

The present invention in one aspect provides for a turbine for generating energy from a fluid flow. The turbine has a central axis; and a plurality of foils rotatable about the central axis. Each of the foils has a foil axis parallel to the length of the foil and the central axis, and is rotatable about its foil axis. Each foil assumes an attack angle to a direction of the fluid flow during operation of the turbine, the attack angle dynamically controlled about the foil axis as the foil rotates about the central axis so as to maximize the foil's moment about the central axis. Furthermore, the attack angle of each foil assumes its attack angle to the fluid flow direction responsive to a velocity and direction of the fluid flow, the angular location and velocity of the foil as the foil rotates about the central axis.

In another aspect, the present invention provides for a method of operating a turbine to generate energy from a fluid flow. The turbine has a plurality of foils rotatable about a central axis. Each of the foils has a foil axis parallel to the length of the foil and the central axis, and each foil is rotatable about its foil axis. The method comprises dynamically controlling an attack angle of each foil to the direction of fluid flow about the foil axis as the foil rotates about the central axis so as to maximize the foil's moment about the central axis. Furthermore, in the controlling step, the attack angle of each foil assumes an attack angle to the fluid flow direction responsive to a velocity and direction of the fluid flow, the angular location and velocity of the foil as the foil rotates about the central axis.

The present invention in still another aspect provides for a turbine for generating energy from a fluid flow. The turbine has a central axis; a plurality of foils rotatable about the central axis, each of the foils having a foil axis parallel to the length of the foil and the central axis, each of said foils rotatable about its foil axis; and means for dynamically controlling an attack angle of each foil to a direction of fluid flow about the foil axis as the foil rotates about the central axis so as to maximize the foil's moment about the central axis.

Other objects, features, and advantages of the present invention will become apparent upon consideration of the following detailed description and the accompanying drawings. The same reference numerals have been used throughout the drawings as much as possible for identical or similar elements and features to aid the reader's understanding of the various aspects and embodiments of the present invention.

DETAILED DESCRIPTION OF THE EXAMPLE EMBODIMENTS OF THE INVENTION

Figure 1:
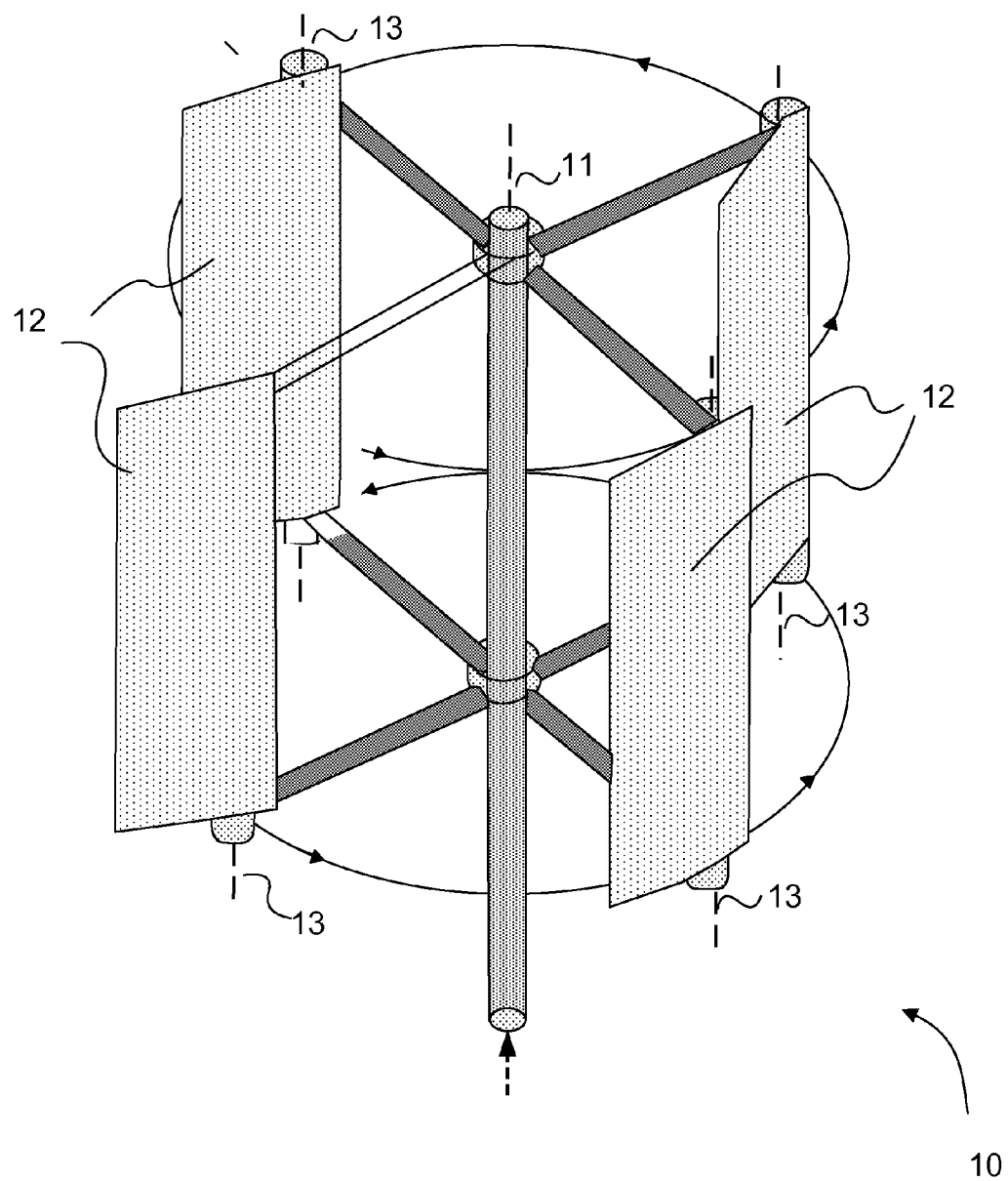
FIG. 1 is a perspective view of a representative turbine according to one embodiment of the present invention.

A general and representative arrangement and operation of an improved turbine according to an embodiment of the present invention is illustrated in FIG. 1. The turbine 10 has the form of a paddlewheel with foils 12 which, under fluid flow, rotate about a central axis 11. In this example, four foils 12 are selected to better show the arrangement and operation of the turbine 10. Each of the foils 12 has an axis 13, parallel to the central axis 11, about which the foil 12 can rotate. In operation, the position of a foil 12 about its axis 13 is controlled by a computer and is dependent upon the foil's position about the central axis 11 and the direction of the fluid flow, as explained in detail below.

The operation of the foils in a turbine working in accordance with aspects of the present invention might best be understood by an examination of how a fluid medium, air in this case, operates upon foils in general. The description below assumes that velocity of air is low and it should be understood that the fluid medium can also be a liquid, such as water. Hence the words, foil and airfoil, are sometimes used interchangeably and much of the description of an airfoil is applicable to a foil operating in water.

Figure 2:
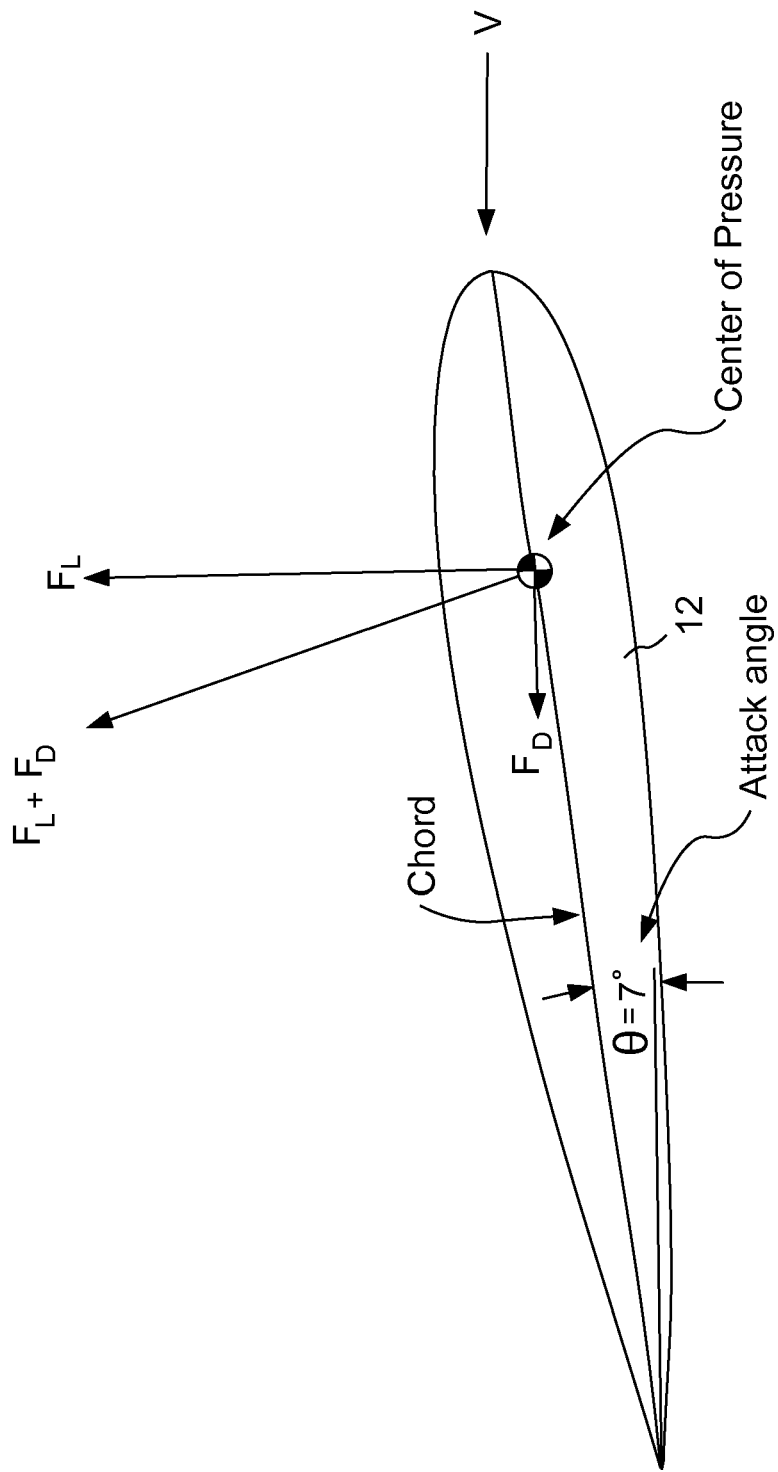
FIG. 2 shows a symmetric foil and the generated lift and drag vectors, center of pressure and the total force vector on the foil as a result of the fluid flow direction from the leading edge to the trailing edge.

The magnitude of the lift and drag forces generated by a foil in a fluid flow is given as:

$$F_L = K_L(\theta) * S * v^2 \quad (1)$$

$$F_D = K_D(\theta) * S * v^2 \quad (2)$$

where $F_L$, $F_D$, $K_L$, $K_D$, $\theta$, S, and v are the lift and drag forces, lift and drag coefficients, attack angle, surface area, and fluid flow velocity respectively. FIG. 2 shows a symmetric airfoil and the generated lift and drag vectors at the center of pressure and the total force vector as a result of the fluid flow direction from the leading edge to the trailing edge. These equations are based on extensive research and experiments since the beginning of the 20$^{th}$ century. See, for example, M. S. Rice, *Handbook of Airfoil Sections for Light Aircraft* (1971); I. H. Abbott and A. E. Von Doenhoff, *Theory of Wing Sections* (1959); B. W. McCormick, *Aerodynamics, Aeoronautics, and Flight Mechanics* (1979). These references along with any other references cited herein are incorporated by reference for all purposes. There are also very widely used proprietary and publicly available computer simulation programs which can determine the forces generated on practically any foil geometry, even in three dimensions, in a fluid flow.

Figure 3:
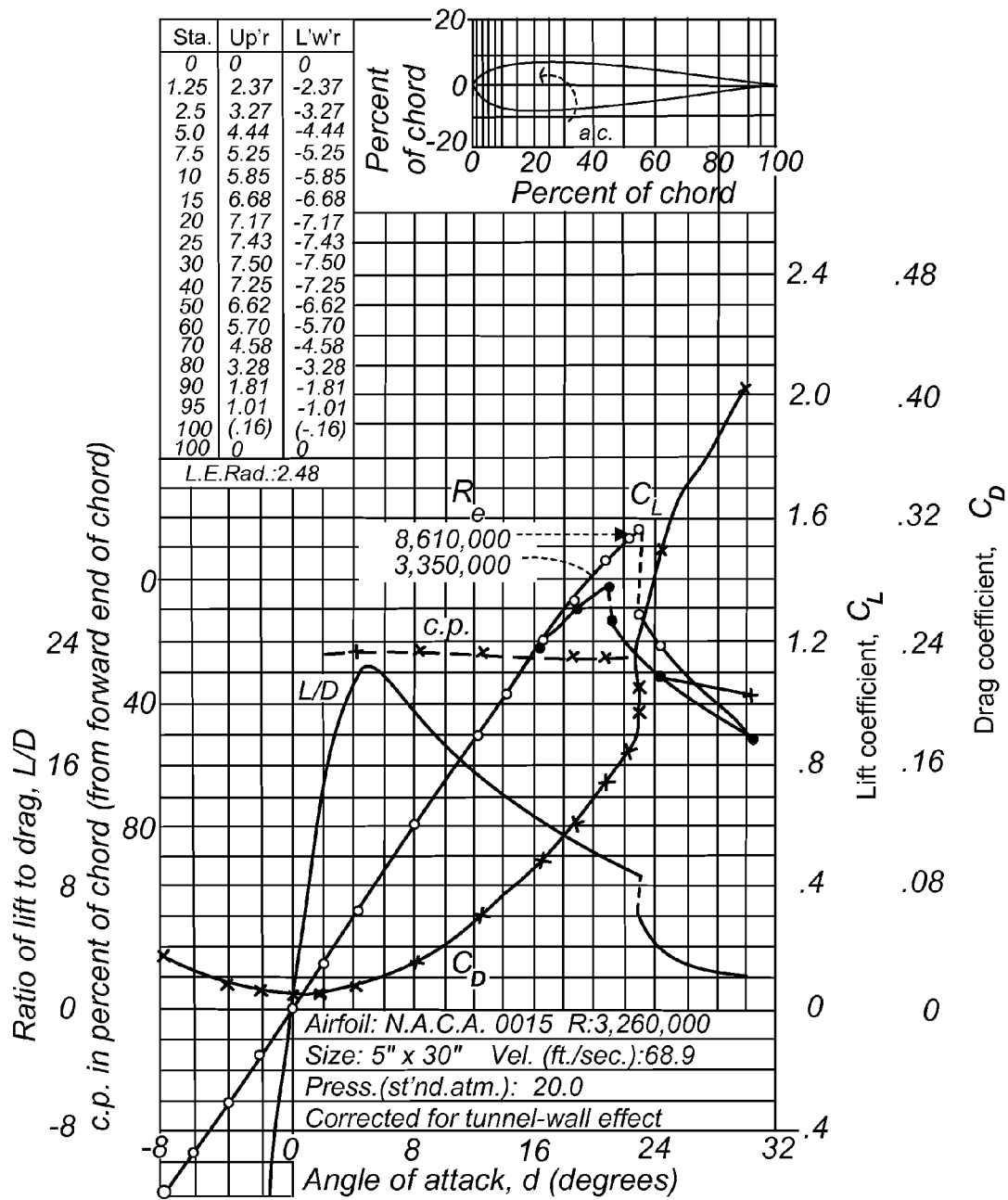
FIG. 3 shows the lift, drag, and center of pressure as a function of attack angle for a particular representative airfoil NACA0015 in the form of graphical and tabular data.
Figure 4:
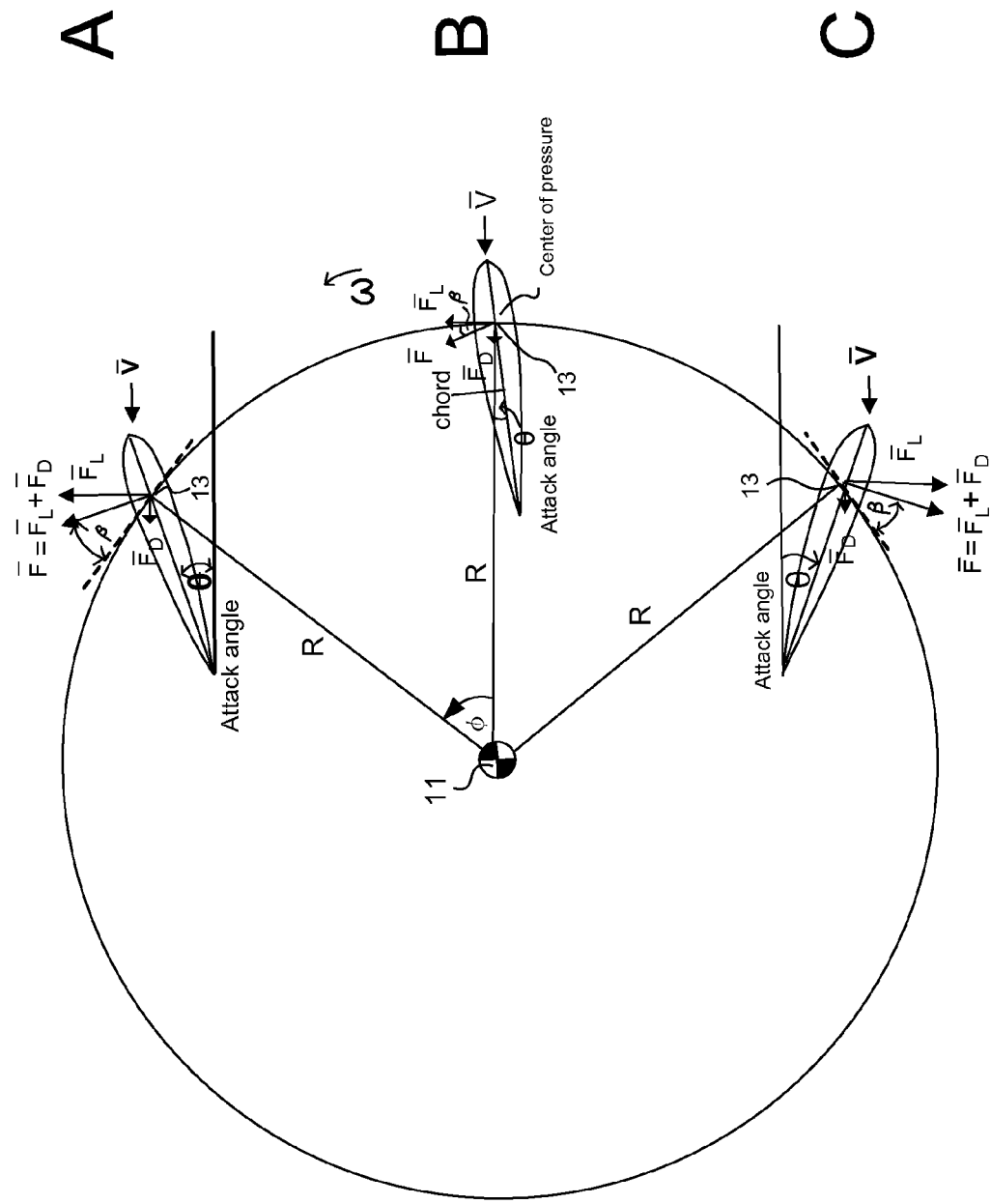
FIG. 4 shows three foils with different angles of attack to illustrate how the lift and drag vectors vary with positive and negative attack angles.

FIG. 3 shows the lift drag center of pressure as a function of attack angle for a particular airfoil, NACA0015, from one of the references above. As can be seen in FIG. 3, the lift and drag coefficients are almost linearly proportional to the attack angle up to the stall angle. The center of pressure also varies with the attack angle, but much less than the lift and drag coefficients. Needless to say, every different airfoil has a different characteristic as shown in FIG. 3 and a designer selects one which is most suitable for his or her design. FIG. 4 shows three airfoils at rotational locations A, B and C with +19, +7, and −19 degrees of attack angles respectively to show how the lift and drag vectors vary with positive and negative attack angles θ in the operation of the FIG. 1 turbine as explained herein. Positive is assumed to be in a counterclockwise direction with respect to the central axis 11 and likewise with respect to foil axes 13.

As can be seen from equations (1) and (2) above, the lift and drag forces are linearly proportional to the airfoil area S, lift $K_L$ and drag $K_D$ coefficients, and quadratically proportional to the fluid flow velocity v. For a given fluid flow velocity, which is assumed to be relatively slow, the only way to increase the forces in equations (1) and (2) is to change the attack angle θ or increase the airfoil area S, or both. Hence to generate a desired power from a slow fluid flow, a power generating system must have a much larger area than that of an equivalent power generating system designed for a faster flow fluid system.

Slow fluid flows are of interest because in nature these types of flows are very common, such as winds and ocean currents. But while the total energy in these flows is large, the "energy density" of a slow flow is small. As a result, a mechanical system must be large to effectively generate large amounts power from these fluid flows. However, as mentioned earlier, wind and ocean currents can change directions relatively quickly and an energy generation system should be able to respond to these changes rapidly and efficiently. This leads to a system with contradictory requirements, a large structure which is required to turn or move quickly. For example, the axis of blade rotation in most of the wind farm turbines today is either fixed or moves slowly.

The paddlewheel structure shown in FIG. 1 resolves these seemingly incompatible requirements. The structure is symmetric about its central rotational axis 11 which may be vertical or horizontal. Typically winds and currents move horizontally parallel to the ground and water surface which form boundaries for their respective fluids. If the central axis 11 is vertical, or perpendicular to a boundary of the fluid, the structure is essentially omnidirectional with respect to fluid flow directions. This obviously is a very important advantage in field applications where the fluid flow direction may change often. A power generation turbine with a vertical central rotational axis structure in accordance with the present invention can adapt to fluid flow changes rapidly and efficiently for maximum power generation.

Figure 5:
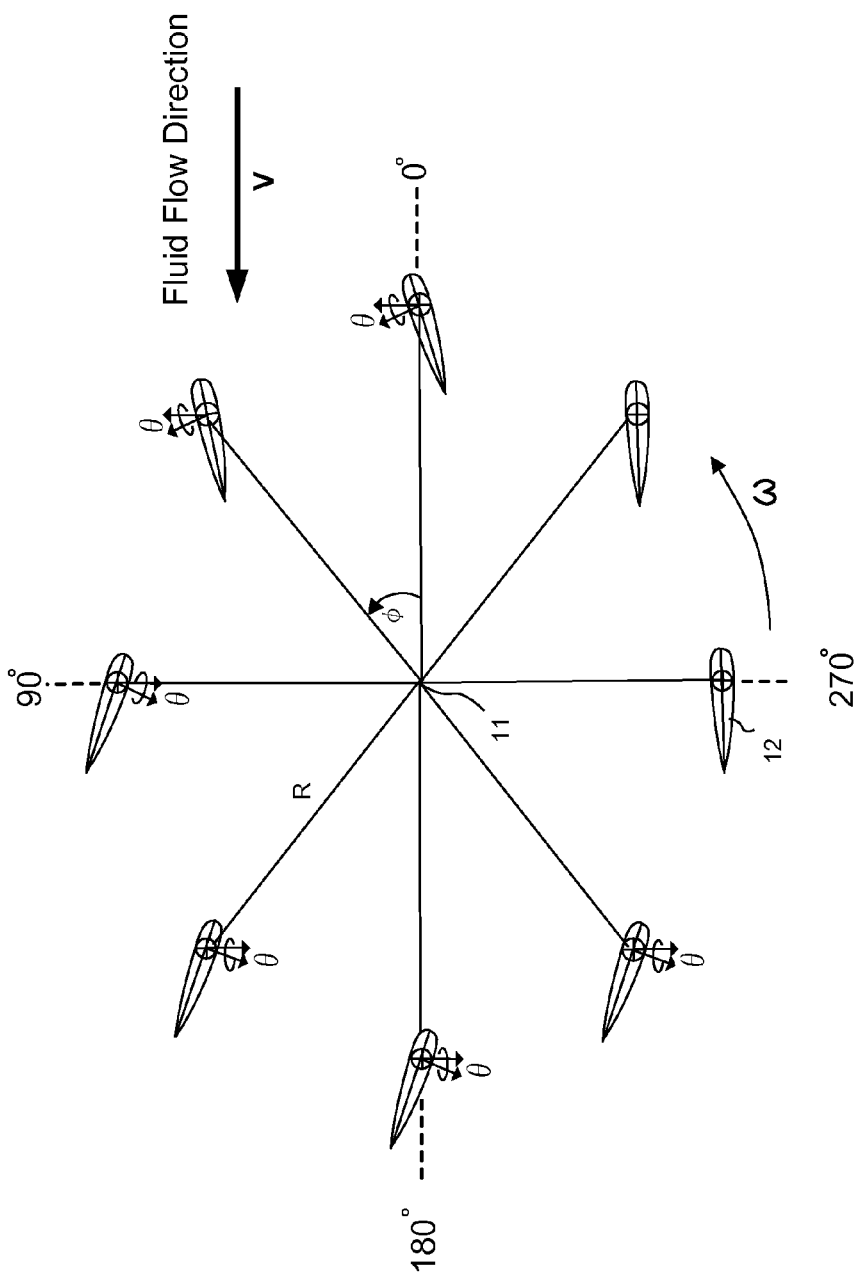
FIG. 5 shows the attack angle of a turbine foil in eight rotational locations controlled as a function of the foil's location, the fluid flow direction and speed, and rotational speed of the foil in accordance with one embodiment of the present invention.

As exemplified in FIG. 1, a plurality of foils 12 are mounted in a circle around the central axis 11 around which the foils 12 rotate. The foils 12, having a constant cross-section, can also rotate about their individual foil axes 13. The attack angle of each foil 12, the angle of the foil 12 with respect to the direction of fluid flow, is controlled by computer as a function of the fluid flow velocity and direction, the angular location and velocity of the foil 12 as it rotates about the central axis 11. This is illustrated in FIG. 5 which shows the foil positions, i.e., the foil attack angles given by the angle θ, at eight possible locations, defined by an angle φ around the central axis 11, of a plurality of foils 12 as they rotate about the central axis 11 in a counterclockwise direction. The foils 12 at the eight foil locations, i.e., angle φ=0, 45, 90, 135, 180, 225, 270 and 315 degrees with respect to the direction of the fluid flow defined by vector V, illustrate the optimal foil attack angles at these locations with respect to the fluid flow direction for the airfoil NACA 0015.

Again assuming that positive is in a counterclockwise direction with respect to the central axis 11 and likewise with respect to foil axes 13, at location angle φ=0°, the optimum attack angle θ for the airfoil 12 is positive to provide positive lift (a positive moment about the central axis 11) and remains so at location angle φ=45°. But at location angle φ=90°, the optimum attack angle θ is negative to continue to provide a positive moment about the central axis 11. The optimum attack angles θ remains negative for angles φ=135, 180 and 225°. At location angle φ=270°, the optimum attack angle θ is 0° and at location angle φ=315°, the attack angle is slightly positive. It should be understood that these angles illustrate the general operation of the foils 12. The particular optimum attack angles are shown for airfoil NACA0015 and other attack angles may be optimum for other foils. Furthermore, the attack angle of a foil with respect to the medium flow direction is also a function of the fluid flow velocity and the angular velocity of the foil 12 about the central axis 11.

Figure 6:
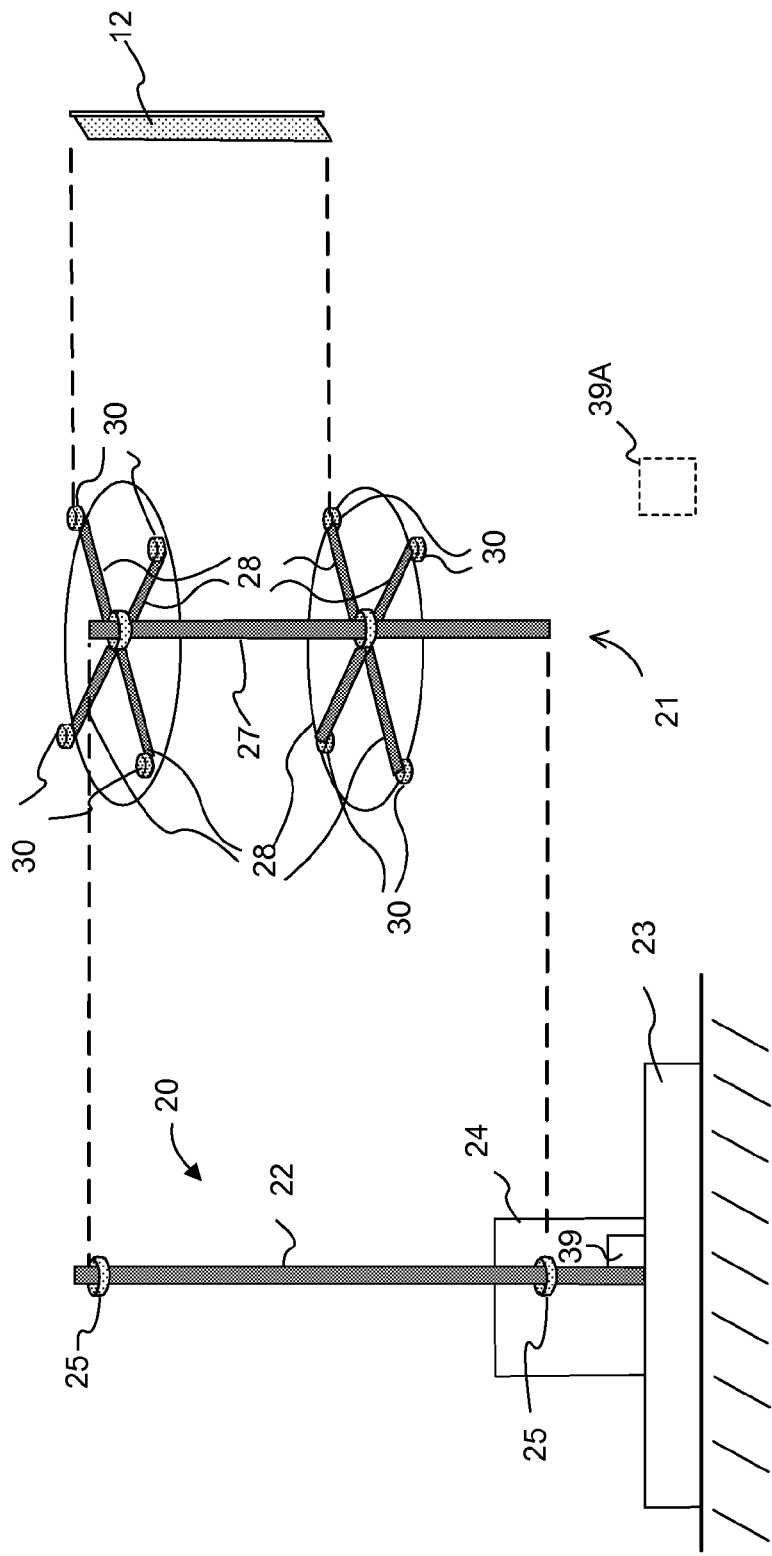
FIG. 6 shows the basic three parts of the FIG. 1 turbine.

The details of a power generating turbine according to one embodiment of the present invention are illustrated in FIG. 6. The turbine has three basic parts, a central axis assembly 20, a foil cage assembly 21 and the foils 12 themselves. The central axis assembly 20 is formed by a stationary rod 22 which is mounted to the ground or ocean floor by a foundation 23 for wind and water turbine applications respectively. The stationary rod 22 defines the central axis 11. The foundation 23 also holds the gear, belt, or chain-driven electric generator in a service and generator platform 24. The stationary rod 22 has bearing and mounting points 25 to allow a hollow central shaft 27 of the airfoil cage assembly 21 to rotate around the rod 22.

The foil cage assembly 21 includes the central shaft 27, which rotates easily about the stationary rod 22, and pairs of foil support rods 28 which are fixed to the shaft 27. The foil support rods 28 are perpendicular to the central shaft 27 and parallel to the ground in FIG. 6. Each foil support rod 28 of a pair, top and bottom, is also parallel to the other and the number of pairs of foil support rods 28 is equal to the number of foils 12 in the particular turbine design. At the end of each of the foil support rods 28 is a foil housing 30 which holds attack angle control mechanisms. The mechanisms include one or more stepper motors, servo motors, hydraulic or pneumatic driver systems, which rotate each foil 12 about its foil axis 13 which is parallel to the length of the foil 12 for the proper foil attack angle as described above. For smaller turbine designs, the motors or drive systems are mounted at the end of only one of a pair of foil support rods 28. Electric power is provided to the attack angle control mechanisms at the end of the rods 28 from the service and generator platform 24 through electrical brush couplings, such as often used in rotating structures. Likewise, similar couplings can be used for the hydraulic and pneumatic drive systems.

Alternatively, rather than a pair of foil support rods 28 at each end of a foil 12, a single foil support rod 28 might be placed at the center of the foil 12 with its foil axis 13 extending through the rod 28. The foil surfaces are divided in two to accommodate the rod 28 and the foil housing 30.

A shaft encoder is mounted to the central shaft 27, part of the central axis 11 of the turbine. Either absolute or relative shaft encoders may be used, but an absolute shaft encoder simplifies the turbine design. The output of an absolute shaft encoder yields the rotational shaft angle from a selected static reference point. Since the foils 12 are placed at fixed locations on the foil cage assembly 21, the angular or rotational location, i.e., angle φ, of each foil 12 with respect to the reference point can easily be determined from the shaft encoder.

The foils 12, which have a constant foil section along their lengths, are each mounted between their corresponding foil support rods 28 in the airfoil cage assembly 21. The foils 12 are placed in their housings 30, which contain all the bearings and the foil attack angle control mechanisms. To allow each airfoil 12 to rotate about its foil axis 13 with minimal energy, the foil rotational axis 13 is aligned with the center of pressure and center of gravity of the foil 12, themselves designed to coincide. In general, the center of pressure of a foil for any attack angle does not necessarily coincide with its center of gravity. At high rotational speeds, the centrifugal force acting upon the center of gravity of the foils can generate a large turning moment which must be overcome by the servo or stepper motors which control the attack angle.

Figure 7:
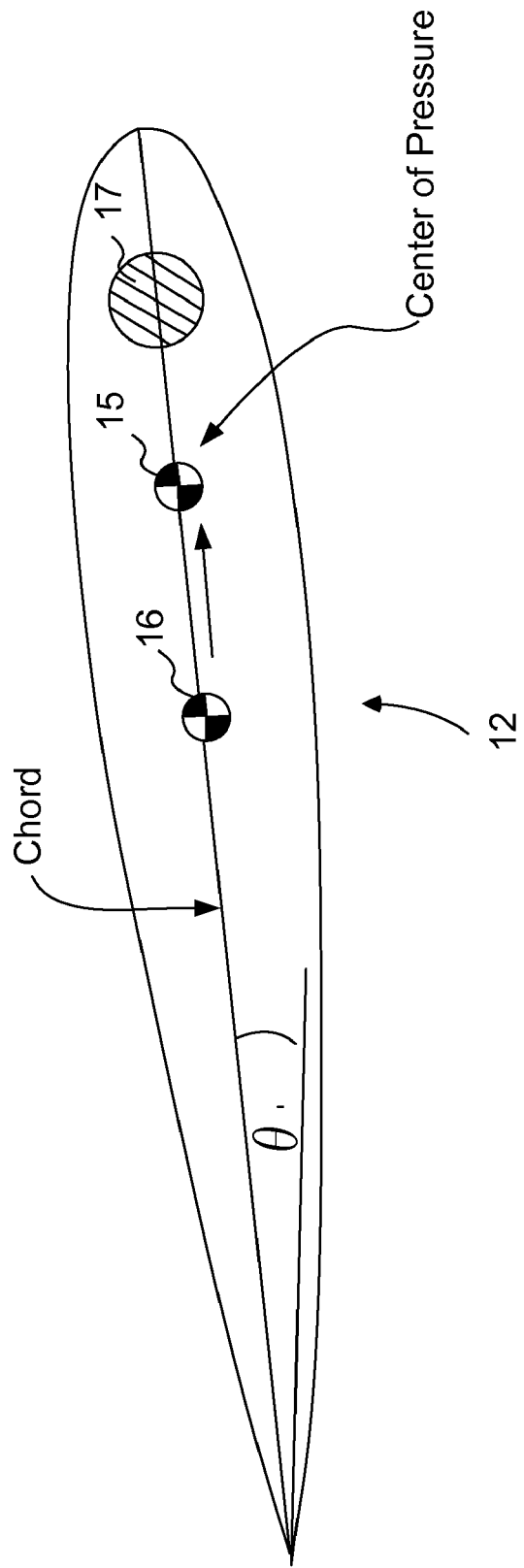
FIG. 7 is a chord cross-section of a foil to illustrate how the center of gravity of the foil is moved to coincide with the center of pressure in accordance with an embodiment of the present invention.

An example foil 12 whose foil section is illustrated in FIG. 7 shows how the center of gravity of the foil 12 is moved to coincide with its center of pressure in accordance with one embodiment of the present invention. As might be surmised by the foil section in FIG. 7, the center of gravity 16 is located near the center of the foil behind, i.e., toward the trailing edge, the center of pressure 15. To move the center of gravity 16, a rod 17 of dense material, such as metal, powdered metal, metal pellets and even sand bonded into a solid, is inserted into the foil near its leading edge. The material is selected for the turbine's particular application. The rod 17 effectively moves the center of gravity 16 forward toward the center of pressure 15. By adjusting the location of the rod 17 and its mass, the center of gravity can be moved to substantially coincide with the foil's center of pressure. As described earlier with respect to FIG. 3, a foil's center of pressure moves slightly with changes in the attack angle θ. For water turbines, such as described below with respect to FIGS. 14A and 14B, the rod 17 can be used to create foils of neutral buoyancy in water to eliminate that possible source of force on the foils.

Returning to the control of each foil 12, the angular position of the foil 12 is effected by one or more servo or stepper motors, part of the foil's attack angle control mechanism in foil housings 30 at the end of the foil support rods 28. There are also shaft encoders for each foil 12 to give the foil's angular position about the foil's rotation axis 13 relative to a local reference. With all foil angles referenced to their foil support rods 28 and to the main central rotational shaft 27, the optimal attack angle calculated by computer for each foil 12 is referenced to the rotational position of the main shaft 27.

Furthermore, if the foils 12 include high lift devices, such as the leading edge slats or trailing edge flaps, or both (explained in detail below), electric, hydraulic or pneumatic power is also supplied to the foils 12 for their stepper or servo motors for the high lift devices, along with their control signals.

A computer preferably in the form of one or more microcontrollers is preferred to operate the turbine in real time. The computer is preferably located in the service and generator platform 24 represented by the box 39 in FIG. 6 and communicates over control lines parallel to the power lines. Alternatively, the computer might be located separately from the service and generator platform 24 and displaced from the central axis 11 and foils 12, such as indicated by the displaced dotted line box 39A. In this embodiment the computer sends output control signals and receives input control signals, e.g., encoder signals, wirelessly. Of course, in this case the encoders for central axis 11 and foil axes 13 have transmitters, and the foil servo or stepper motors have receivers for wireless communication with the computer 39A which has both a transceiver and receiver.

An abbreviated version of the computer program of the analytical computer described below is installed in the computer. The parametric settings for this program include the number, type and the location of the foils 12, the foil data for the lift/drag/center of pressure as a function of attack angle θ as a table function, and the radius R of the rotation. The input control signals include the dynamic angular position φ of each foil, the rotational speed ω of the turbine, the direction and the speed of the fluid flow against the turbine, vector V. The output control signals include signals to the servo or stepper motors for each of the foils 12 to assume its optimal attack angle for the foils 12 to maximize the moment with respect to the central rotational axis 11. The attack angle θ of a foil 12 is a function of its angular location φ, rotational speed ω, the velocity and direction of the fluid medium, V. The computer 39 allows this calculation to be performed for any type of foil section and any number of foils 12 so that improvements to the turbine can be made be easily.

As shown by the vectors 34 on all the airfoils 12 in FIG. 5, a positive moment described as an anti-clockwise rotation about the central axis 11 is generated with these computer-optimized attack angles. The lift, drag, and total vectors at every angular location is calculated and drawn as shown in FIG. 5 for a visual representation of the operation of the turbine according to the present invention. These calculations are made by modeling the turbine structure of the present invention by ignoring elastic effects with standard differential equations:

$$M = I\frac{d^2\varphi}{dt^2} + k_r\frac{d\varphi}{dt} \tag{3}$$

and $$\omega = \frac{d\varphi}{dt} \tag{4}$$

where φ, M, I, $k_f$ and ω are respectively the rotational angle about the center axis 11 in radians, the moment, the moment of inertial, the rotational friction coefficient and the rotational speed in radian/sec. Since the foils 12 rotate with a rotational speed ω and the v in the lift and drag equations shown in (1) and (2) is the magnitude of the relative fluid flow velocity with respect to the rotating foil 12 in m/sec. To obtain the relative fluid flow velocity with respect to the rotating foil 12, some calculations are needed to substitute eqns. (1) and (2) into eqn. (3).

Figure 8:
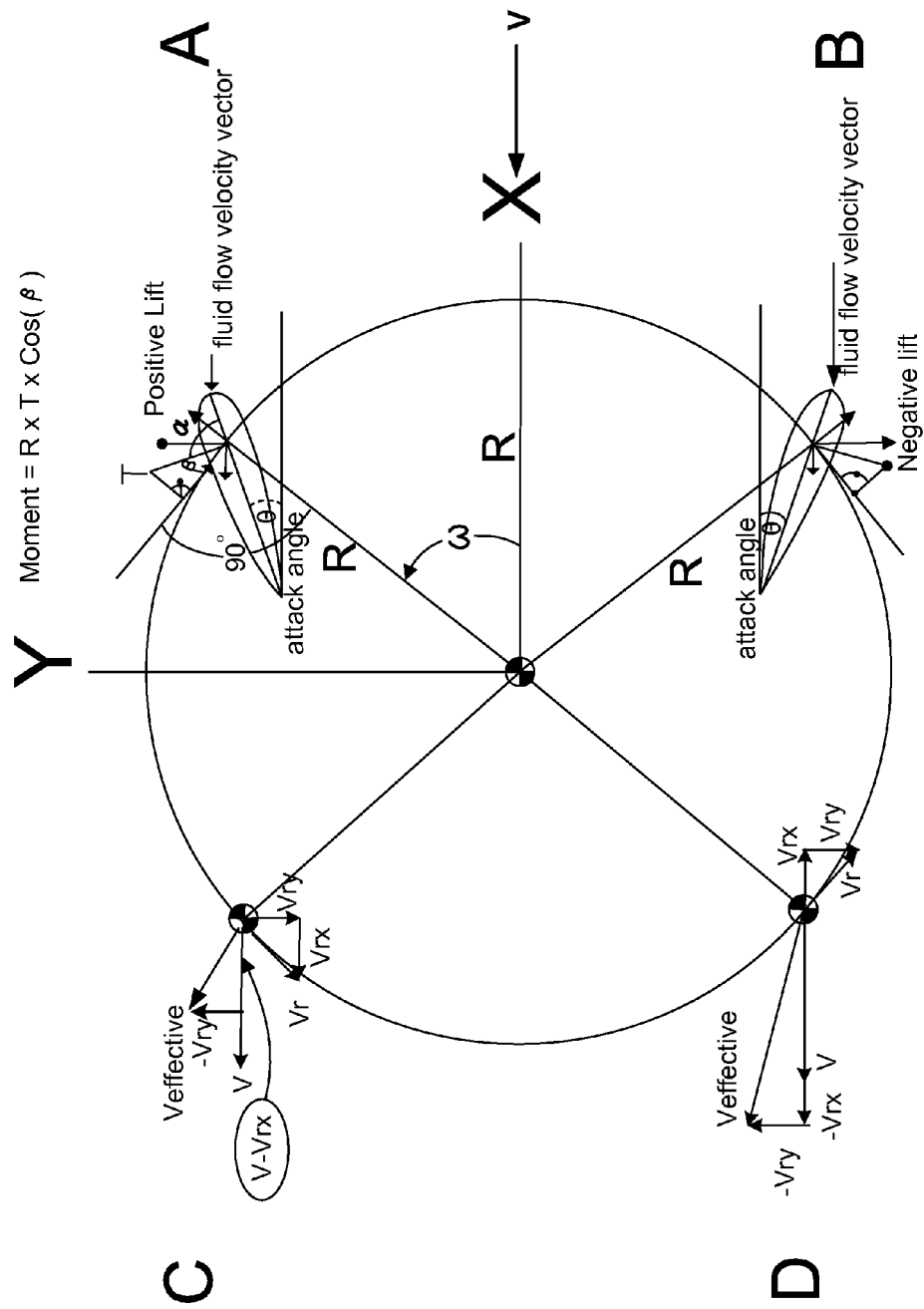
FIG. 8 shows the relation between the forces generated, the moment, and attack angle on a foil at two arbitrary locations on a turbine according to the present invention.

FIG. 8 shows the relation between the angular location of a foil 12 shown at arbitrary locations A, B, C and D, shown here as approximately angle locations φ=50°, 310°, 130°, and 230° respectively. In particular, locations C and D illustrate the foil's, angular velocity ω, its related tangential velocity $V_t$ and the fluid velocity $V_f$ resulting in an effective fluid flow direction and velocity at that location in greater detail. This can be formulated in vector form as:

$$V = V_f - V_t \tag{5}$$

where the fluid velocity in Cartesian coordinates can be written as:

$$V_f = V_x{}^*i + V_y{}^*j, \text{ where } |V_f|^2 = \sqrt{V_x{}^2 + V_y{}^2} \tag{6}$$

$V_x$ and $V_y$ are the fluid components along the x and y axes. Parametric representation of the circular motion of the foils 12 rotating about the origin with the radius R and rotation velocity of ω can be written as:

$$x(t) = R^*\cos(\varphi) = R^*\cos(\omega t); \text{ and} \tag{7}$$

$$y(t) = R^*\sin(\varphi) = R^*\sin(\omega t). \tag{8}$$

Differentiating the equations immediately above with respect to time t yields the tangential velocity in vector form:

$$V_t = R^*\omega^*[-\sin(\varphi)^*i + \cos(\varphi)^*j]; \tag{9}$$

yielding $V = [V_x + R^*\omega^*\sin(\varphi)]^*i + [V_y - R^*\omega^*\cos(\varphi)]^*j.$ (10)

This graphically illustrated at positions C and D in FIG. 8.

A parameter k is very helpful in understanding the relative relationship between the rotational velocity ω to the magnitude of the fluid velocity, $|V_f|$. If the "critical rotational speed," $\omega_{crit}$, is defined as the corresponding rotational speed for the radius R for the fluid velocity $|V_f|$ as $$\omega_{crit} = |V_f|/R \tag{11}$$

In other words, at $\omega = \omega_{crit}$, the tangential velocity of the foil 12 is equal to the fluid velocity $|V_f|$. If the multiplier coefficient k is defined as:

$$k = \omega/\omega_{crit}, \tag{12}$$

one can easily give meaningful combinations of ω, R, and the magnitude of the fluid velocity $|V_f|$. For:

$k=0, \omega=0$ $k=1, \omega=\omega_{crit}$ $k>1, \omega>\omega_{crit}$.

Figure 9:
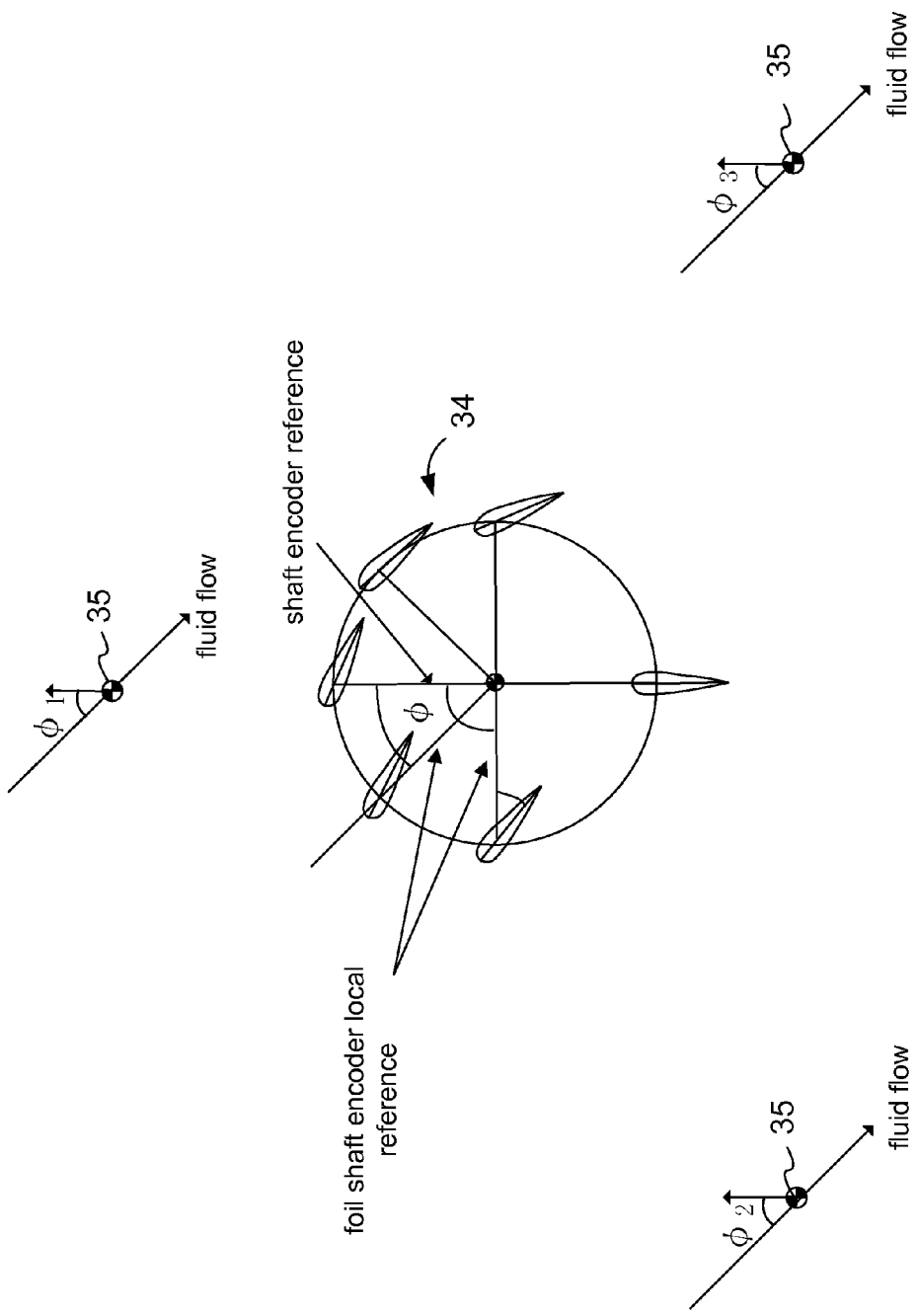
FIG. 9 shows fluid flow direction and speed sensors for a turbine according to an embodiment of the present invention.

Using the k multiplier in the range from 0 to 2 to set ω for any combination of R and $V_x$, $V_y$ pairs, which are related to $|V|$ as given above, leads to meaningful results. FIG. 9 shows the outputs of a computer program for the static, k=0, condition and for the turbine turning at k=0.2, 0.5, 1 and 2 in two different directions. FIG. 5 shows the geometry of the foils 12 at eight different locations with the optimal attack angles as a result of the eqns. (1) and (2) which is used in the optimal attack angle calculations.

As can be seen in FIG. 8, the relative fluid flow velocity with respect to the foils becomes a rather complex function of independent variables of the system, i.e. φ, ω, R and V. Since the vector sum of the lift and drag forces in eqns. (1) and (2) yields the total force vector F as shown in FIG. 2, the total force vector F is also quadratically related to the magnitude of the effective fluid velocity with respect to the foil, $V_f$, in the eqns. above. The moment generated by the total force vector F as in FIG. 4 is given by:

$$\text{Moment} = F^*R^*\cos(\beta) = f(\varphi, \omega, R, \theta, V_f) \tag{13}$$

As can be seen in eqn. (13), the resulting moment is even more highly nonlinear function of φ, ω, R and V and the turbine computer with its program takes the effective fluid speed and its direction into consideration in calculating the optimal attack angles θ for each foil 12 in the turbine.

A positive moment is generated at nearly all foil locations φ by controlling just the foil attack angles θ. A positive attack angle in one location generates a combination of lift and drag vectors giving a sum vector resulting in a positive moment, and a negative attack angle in the opposite location generates an opposite sum vector resulting again in a positive moment.

To determine the speed and direction of the fluid flow with respect to the turbine of the present invention, several fluid flow speed and direction sensors are placed in proximity of the turbine proper 34 as shown in FIG. 9. Even though one sensor placed on the top of the turbine might be sufficient, it is preferable to have more accurate information on this data which changes with time. As shown in FIG. 9, at least three sensors 35 located in the peripheral proximity of the turbine proper 34. To determine the speed and direction of the fluid flow at the turbine from the plurality of sensors, the sensor data is averaged. Of course, the flow sensors should be placed as close to the turbine as possible but not so close that the fluid flow is disturbed by the turbine itself. As a result, the fluid flow direction is accurately referenced with respect to the shaft encoder reference point.

Besides the operation of the turbine, computers are used to optimize the design and operation of the design of the turbine, according to the present invention. The inputs and parameter settings to an analytical computer include the fluid flow velocity and direction, the number of foils in the turbine and their locations relative to a selected reference point in the cage assembly 21, the radius R from the central axis 11 to a foil 12, data tables for the lift/drag/center of pressure as a function of attack angle for the particular foil 12, the rotational speed of the turbine, and the length of the foils 12. The computer calculates the optimal attack angle of all foils 12 at their respective locations continuously as they rotate, i.e., a function of each foil's angular position. Additionally, the computer calculates the lift, drag and magnitude of the forces on each foil 12, the resulting moments and their moment integrals. In a separate mode the analytical computer simulates the motion of the turbine structure by solving the differential equations which characterizes the equation of motion for this complicated entire turbine structure. For these calculations for the dynamic simulation of the turbine being analyzed, additional information, such as the mass distribution data of the entire structure to calculate the moment of inertia, is used. The analytical computer allows the optimization of the turbine structures, the selection of the foils, and sensitivity analysis on the design parameters.

Figure 10A:
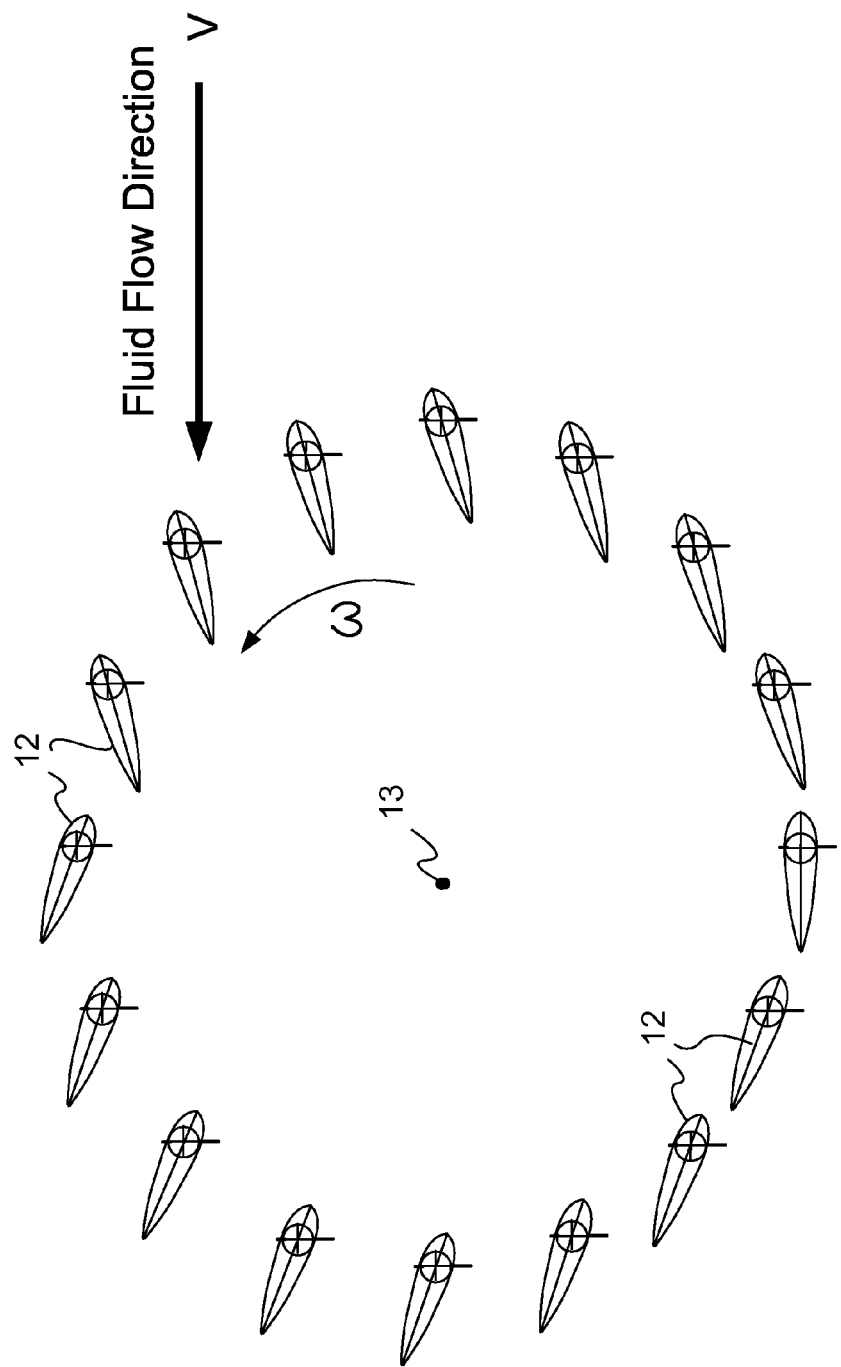
FIG. 10A shows a foil at sixteen rotational locations with optimal attack angles for a turbine according to an embodiment of the present invention.
Figure 10B:
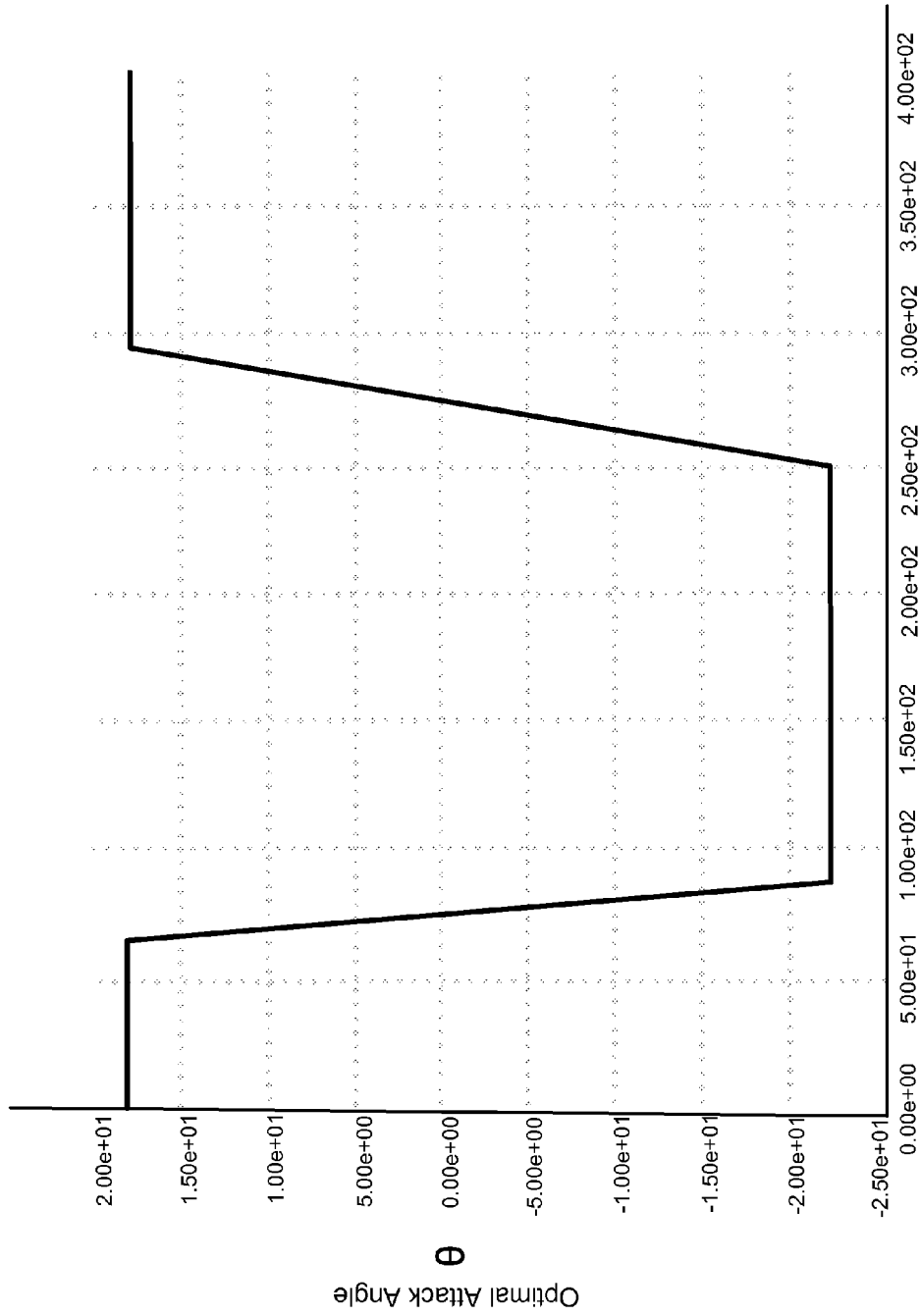
FIG. 10B is a plot of the optimal attack angle as a function of rotational location of the FIG. 10A foil.
Figure 11A:
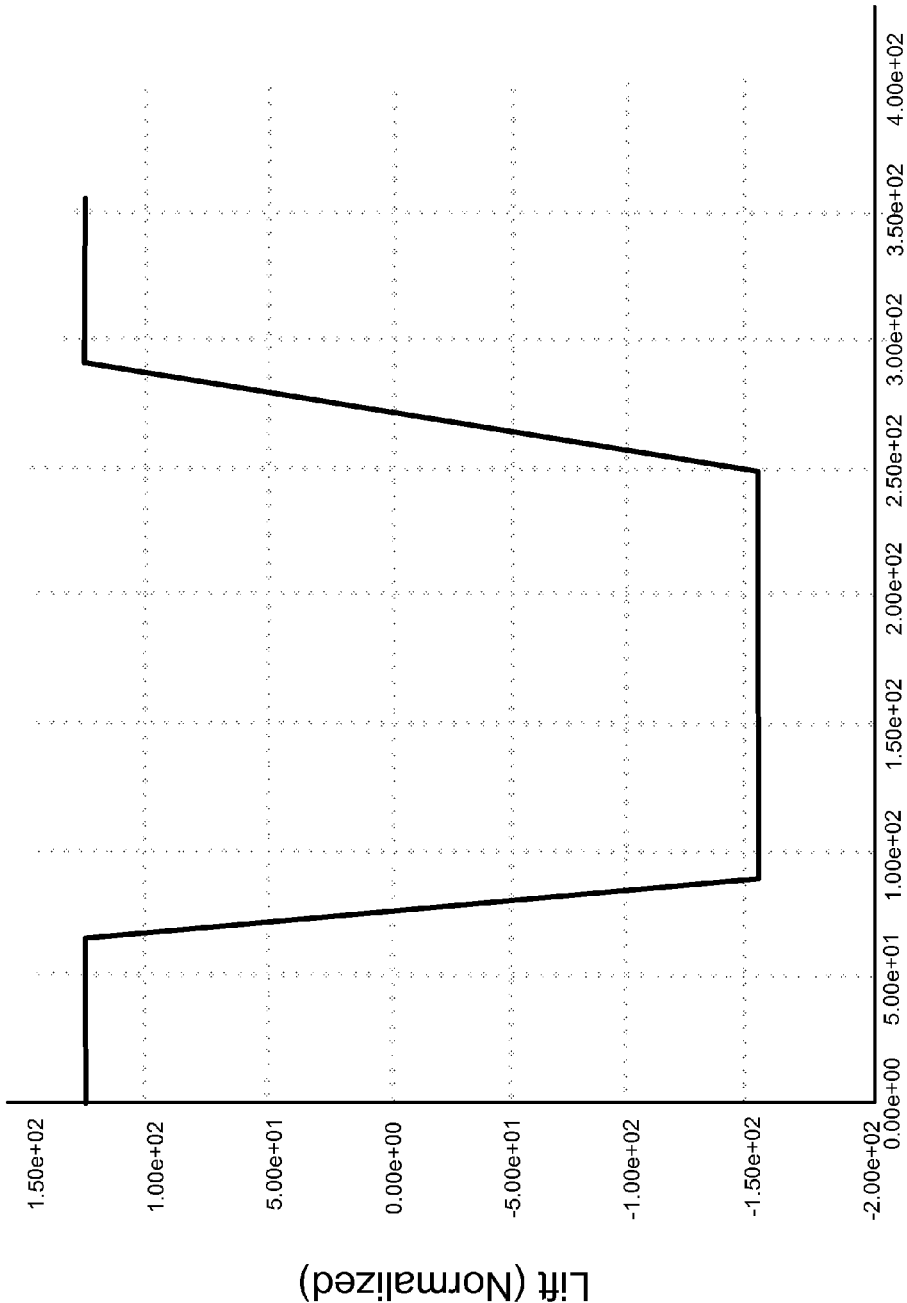
FIGS. 11A-11D are plots of the normalized lift, drag, magnitude of the forces and its moment versus rotational locations of the FIG. 10A foil.
Figure 11B:
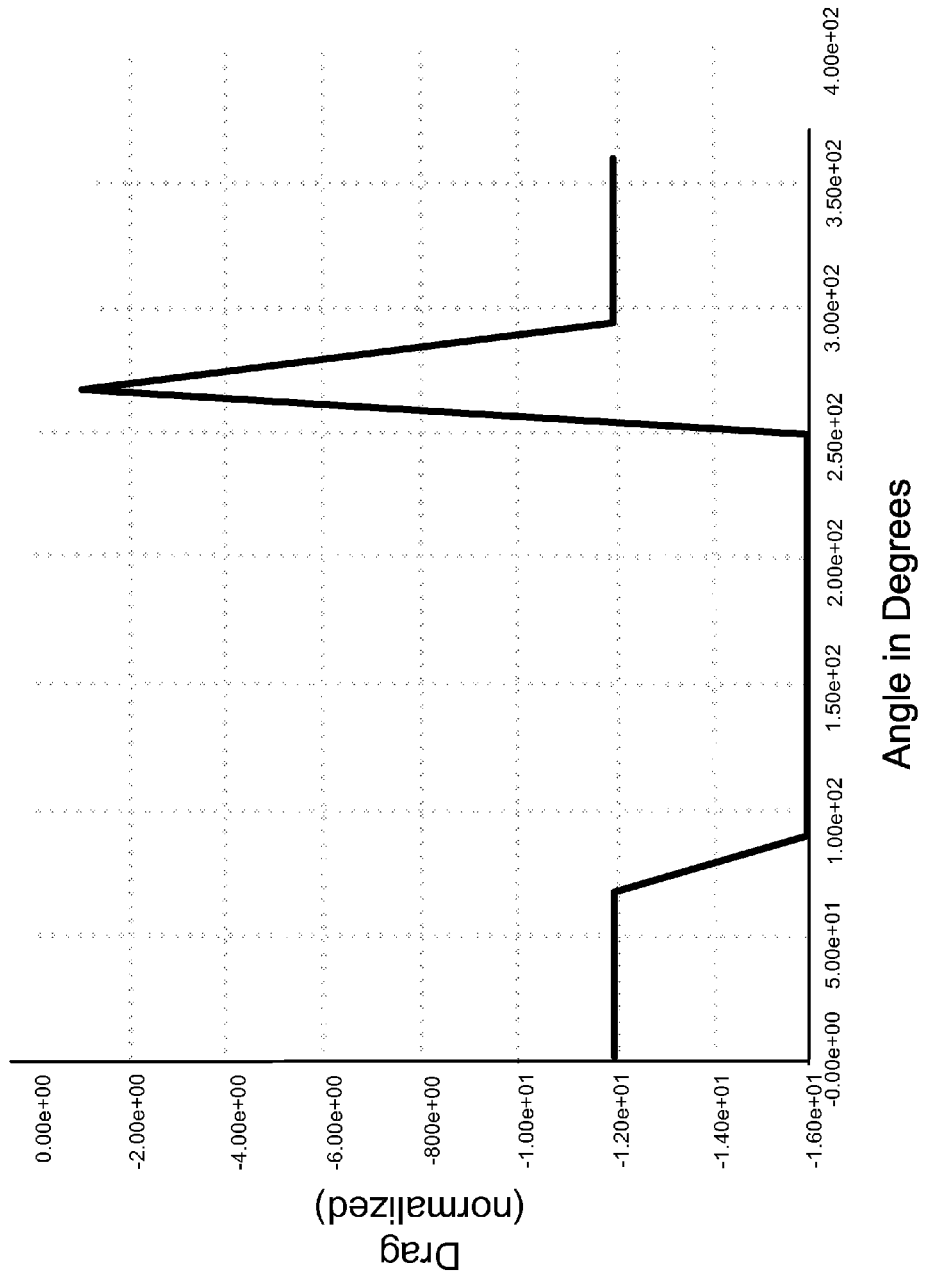
Figure 11C:
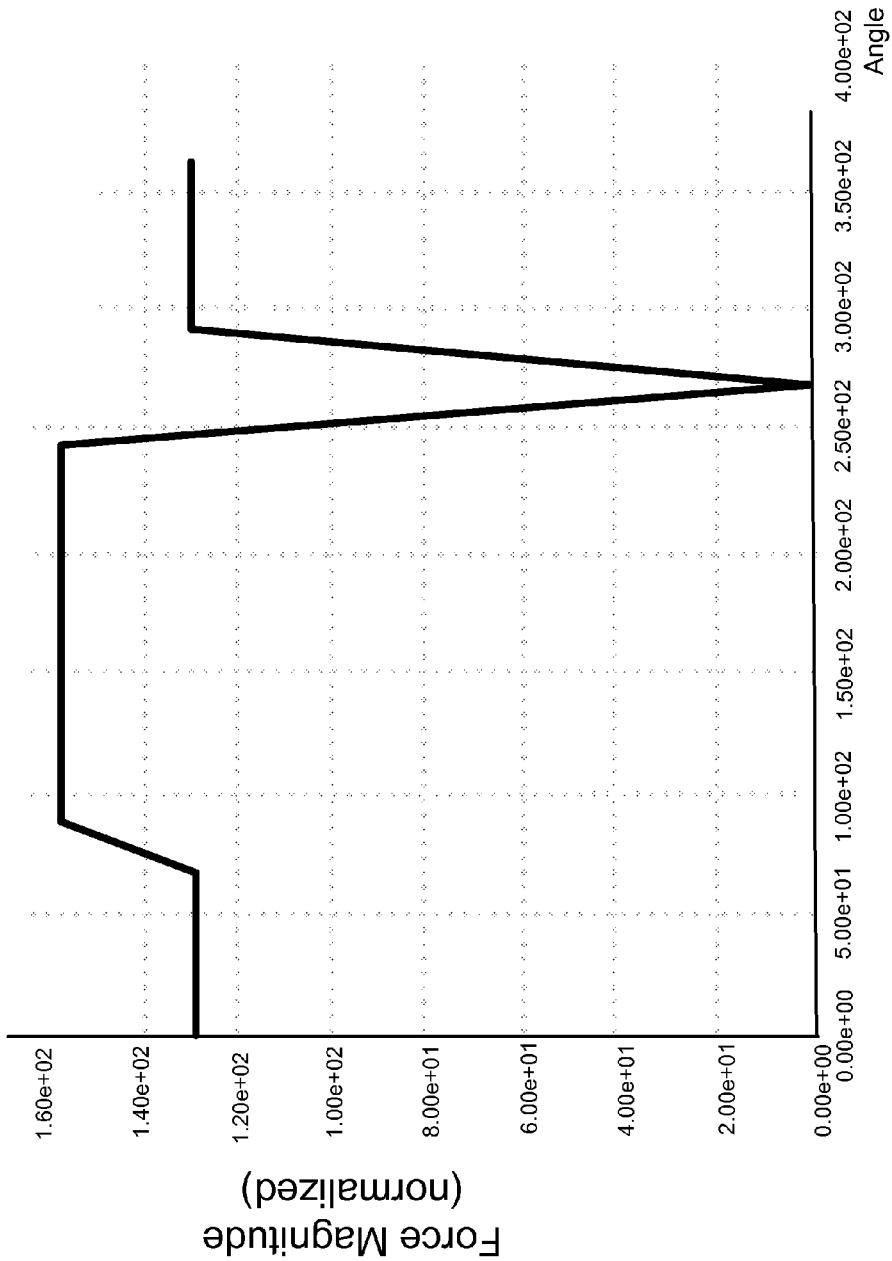

FIG. 10A illustrates the optimal attack angles θ at 16 equally spaced angular locations for a particular foil 12 about a rotation of the central axis 11 and FIG. 10B plots these optimal attack angles with respect to the foil's rotation. The foil in this example is airfoil NACA0015 and the medium is air. FIGS. 11A-11D respectively plots the normalized lift, drag, magnitude of the forces on the foil 12 and its moment as it rotates about the axis 11. It should be noted that the horizontal axes for these graphs are in terms of radians. As shown in FIGS. 11A and 11B, for clockwise rotation the optimal attack angles between angular locations φ=270° to 90° are positive and between 90° to 270° are negative. The attack angle θ is positive for half of the rotation and negative for the other half, which renders a symmetric foil section more efficient compared to a non-symmetric foil, though turbines of the present invention are operable with non-symmetric foils. For increased moments capable of being generated by non-symmetric foils, it is preferable to use high lift devices, such as described with respect to FIGS. 13A and 13B.

Figure 11D:
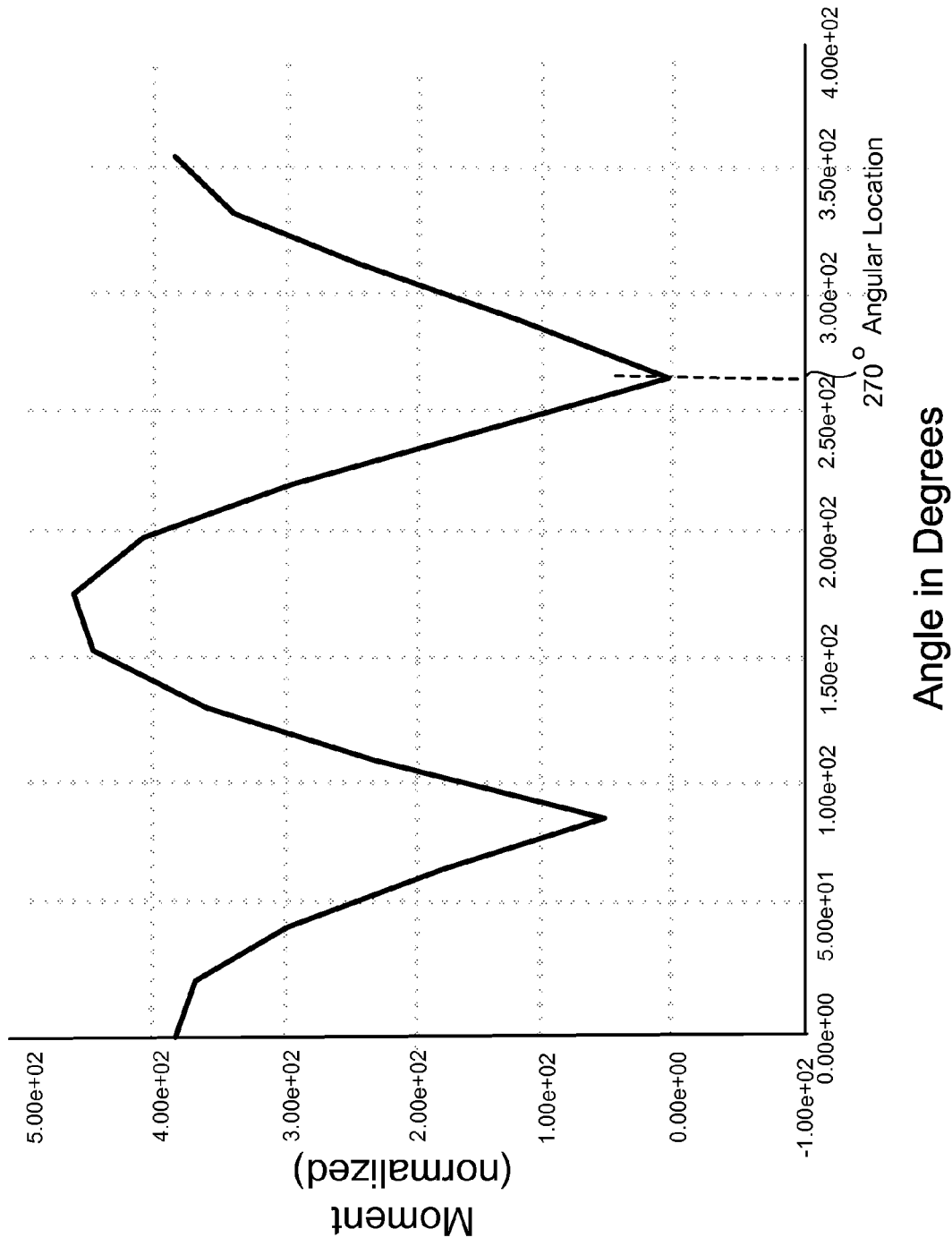

As can be seen at the FIG. 11D, the generated moment for one airfoil is not a smooth or a constant function of the rotational location. For example, the airfoil NACA0015 illustrated in FIG. 11D has a minimum at 270° with a normalized moment of −3 and a maximum moment of 465 at 90°. On the other hand, the moment generated by the blade of a conventional rotary blade turbine is the same at any angular location which results in a smoother operation. But a plurality of foils 12 in a turbine of an embodiment of the present invention ameliorates this problem. With three or more airfoils equally spaced, the net moment of the plurality of foils as a function of angular position is desirably smoother. The spacing between foils, or in other words, their number, is a function of the foil section selected, its chord, i.e., length, the radius of the paddle wheel and the fluid's physical parameters, such as density, viscosity, flow velocity, and so forth. Another factor which weights the number of foils 12 toward an odd number is the downstream effect. With an even number of foils, there is more likely to be a foil directly behind an upstream foil in the fluid flow which is likely to be disturbed at the downstream foil. An odd number of foils avoids this problem to a certain extent.

The integral of the moment curve shown in FIG. 11D between 0 to 360° is a measure of the efficiency of the turbine—the higher the integral value, the better the energy conversion efficiency. For one airfoil, the moment integral with the optimal attack angle at each angular location as the foil rotates, is:

$$\int_0^{2\pi} M(\omega)d\omega = 2\pi \cdot Moment_{Max}/1.728 = 9.688 \cdot 10^4 \quad (14)$$

If the attack angle sign is changed, the moment integral becomes −9.688*10⁴. The sign of this integral can be made negative simply by applying negative optimal attack angles, i.e., by reversing the attack angles of the foil with respect to flow direction as the foil rotates about the central axis 11. The symmetrical structure of the turbine allows this omnidirectional capability as described further below and one can select the direction of the rotation in any fluid flow direction by controlling the foil attack angle with respect to the fluid direction. The leading edge of the foils need only be controlled to face towards to the fluid flow. It should be noted that if the attack angle were set to any fixed value, this integral becomes zero, resulting in an unsustainable rotation for a turbine and the same results apply for a turbine with more than one airfoil.

Figure 12:
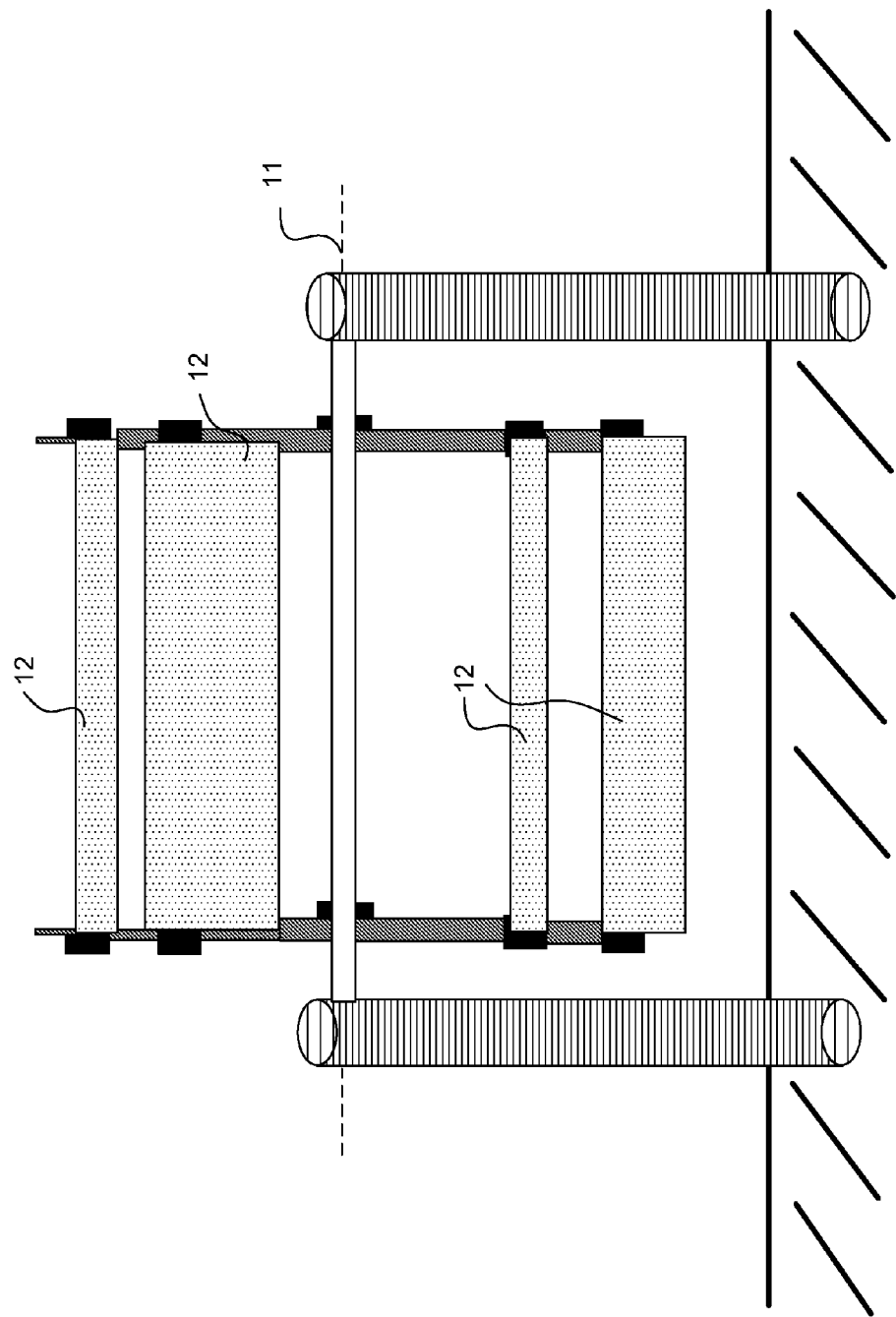
FIG. 12 shows a three-dimensional view of a horizontal axis turbine with four foils according to an embodiment of the present invention.

In contrast, with a horizontal rotational axis in a conventional turbine, the whole structure must be rotated to face the fluid flow direction. For example, see the windmill turbines with rotary blades in current windfarms. Since the structure is very large for wind and water power, this brings many problems and additional complexity in addition to the slow response time compared to the vertical axis turbine of the present invention. Nonetheless, if a horizontal axis turbine were required for some reason, the present invention permits a turbine with a horizontal axis, as shown in FIG. 12.

Besides superiority in adapting to changes in fluid flow, turbines according to the present invention, are more efficient than comparable conventional turbines. This is illustrated by a comparison of the moment integrals, of conventional rotary blade turbines and corresponding turbines according to the present invention.

Whether operated in air or water, a rotary propeller blade is dynamically very complicated. Very sophisticated three-dimensional computer programs are required to analyze its operation and to optimize its geometry. Furthermore, very difficult wind tunnel experiments are required to optimize the structure of the propeller. Perhaps the most important factor in performance is its radial nature. Since a propeller blade is a complex foil with a circular motion about one end, the fluid flow rate varies along the blade by:

$$V = \omega * r \quad (15)$$

where ω and r are the angular velocity and radius respectively. In other words, the relative flow rate at the far edge is greater than the edge closer to the center of rotation. To minimize drag at the blade tip, the attack angle there must be reduced compared to that of the central or roots regions, which is the practice used in all propeller designs to date. This reduces the efficiency of the propeller blade where approximately one-half to one-third of the blade length generates the most of the lift. To calculate the lift force for a propeller, the lift force F is assumed to be uniformly distributed along the blade. By integrating the force from the root to the tip edge, the moment generated by the blade is:

$$Moment_{propeller} = \int_0^R F * r dr = \frac{1}{2} F * R^2 \quad (16)$$

In comparison, a foil with the same length as the propeller in the previously described paddle wheel turbine structure of the present invention has a moment:

$$Moment = h * \int_0^R F dr = h * F * R, \text{ or} \quad (17)$$

$$Moment = F * R^2 \text{ when } h = R.$$

where h is the height (i.e., length of the foil) and R is the radius of the foil cage assembly such as shown in FIG. 8. As illustrated, the turbine moment is twice that of the rotary propeller blade while occupying the same space. Furthermore, with larger foils, i.e., foils with increased lengths, and more foils, the paddle wheel arrangement can even double that moment in the same amount of space.

Since the attack angle at the propeller blade tips is much less than the center and root regions, a more realistic bound for equation (7) is:

$$Moment_{propeller} \leq \frac{1}{2} F * R^2 * \frac{1}{3} \rightarrow (1/6) * F * R^2 \quad (18)$$

Additionally, due to the complex fluid flow around the blade, the value of the moment for a propeller blade is even less than given in equation (9). To complete the analysis the moment over a full rotation must be integrated to compare the efficiencies of the propeller and paddle wheel turbine. Since the propeller's moment is constant at any angular position, the moment integral is:

$$Moment\_Integral_{propeller} = 1/6 * \int_0^{2\pi} F * R^2 dr = (2\pi * F * R^2)/6 \quad (19)$$

On the other hand, the moment integral for the paddle wheel turbine as described herein cannot be calculated analytically. However, numerical calculation yields:

$$Moment\_Integral_{paddle\_wheel} = (2*\pi*Max\_Moment)/1.728 \quad (20)$$

The ratio of equations (11) to (10) to compare the paddle wheel structure to the propeller:

$$Moment\_Integral_{paddle\_wheel}/Moment\_Integral_{propeller} = 3.4722. \quad (21)$$

Hence the paddlewheel turbine of the present invention achieves greater efficiency than the conventional rotary propeller turbine. Additionally, the paddlewheel turbine has advantages of ease of manufacturing, design, construction, and maintenance over conventional turbines. For example, the foils of a paddlewheel turbine have a constant cross-section compared to the complex shape of a propeller blade of a conventional turbine.

Figure 13A:
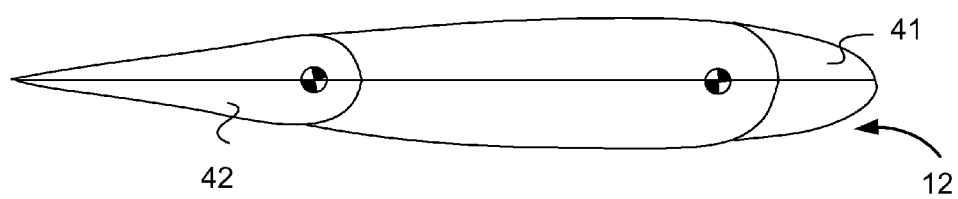
FIG. 13A shows high lift devices incorporated into a foil according to an embodiment of the present invention.
Figure 13B:
FIG. 13B illustrates how the high lift devices operate and cooperate with each other.
Figure 13B:
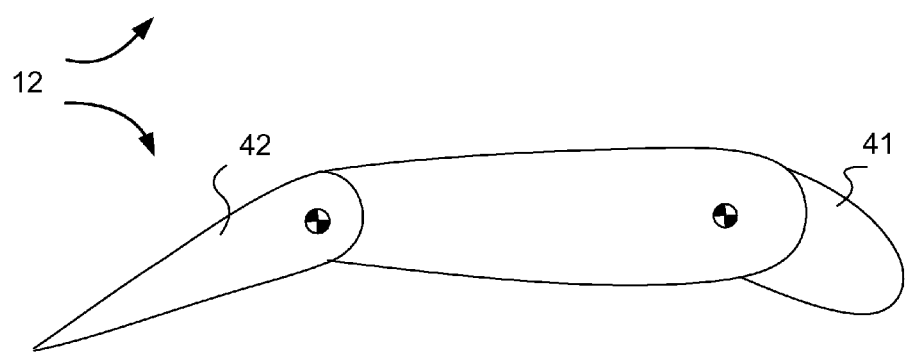

The advantages of turbines of the present invention over conventional turbines can be increased. With additional complexity, turbines can have increased efficiency according to another aspect of the present invention. To further increase the lift and drag, but most importantly, the moment on the foils 12 of a turbine, flaps and/or leading edge slats can be added to the foils 12. These high lift devices shown as leading edge slats 41 and trailing edge flaps 42 in FIG. 13A are operated about the central axis 11, as illustrated FIG. 5. FIG. 13B illustrates how the slats 41 and flaps 42 operate cooperatively in both the "up" and "down" directions. The configuration in FIG. 13A is used whenever minimum drag and lift is needed, such as at the φ=270° location. The "up" and "down" slat and flap configurations in FIG. 13B are employed when the θ attack angles are negative and positive respectively. A transition from the "up" configuration in FIG. 13B to that of FIG. 13A occurs just before the foil reaches the 270° location. As the foil moves past the 270° location, a transition from the FIG. 13A configuration to the FIG. 13B 'up" configuration occurs. Another transition from the "down" configuration to the "up' configuration in FIG. 13B occurs just before the foil reaches the 90° location. These high lift devices not only increase the generated moments at all angular locations by up to a factor of two, they also completely eliminate the very small moment generated at the 270° location as shown and described with respect to FIG. 11D. Turbine efficiency is increased and a smoother moment is generated for smoother operation. Of course, increased complexity and controls are needed for these high left devices. Each foil 12 has one or two more servo or stepper motors, or hydraulic or pneumatic drive mechanisms, depending on the number of high lift devices employed. These motors are controlled by the previously described microcontroller.

Figure 14A:
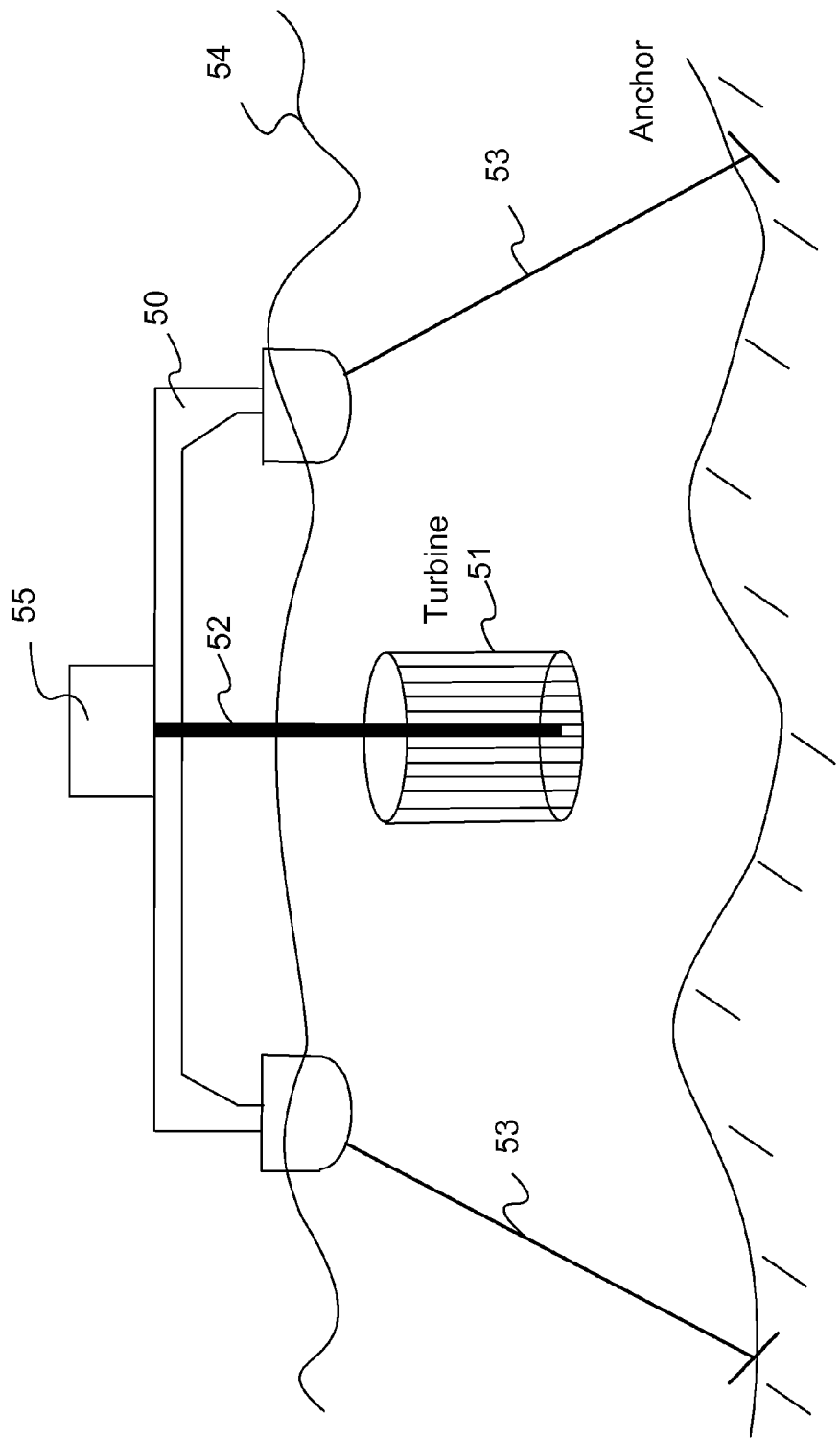
FIG. 14A shows a deep water turbine according to one embodiment of the present invention.
Figure 14B:
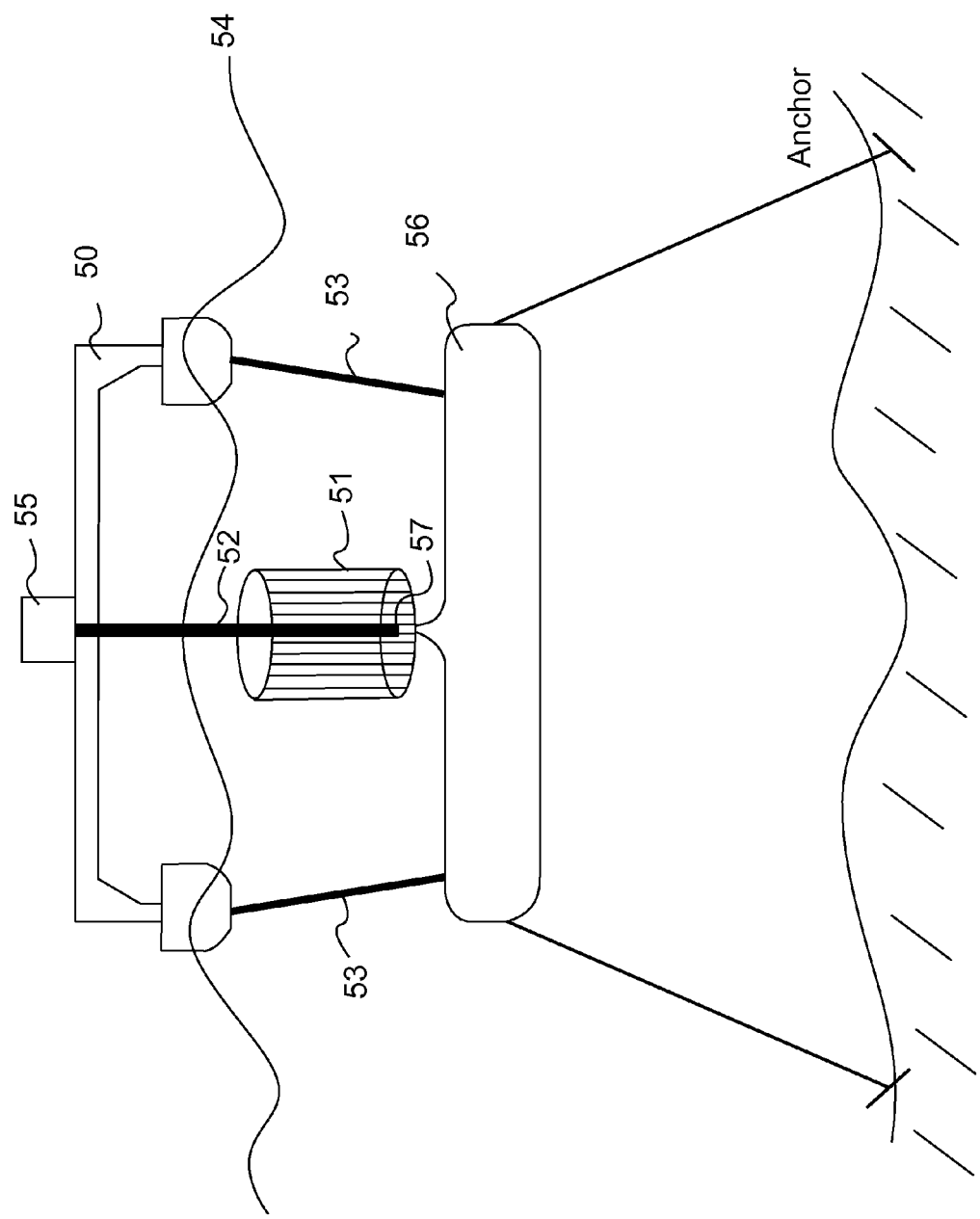
FIG. 14B shows a deep water turbine with great stability.

As stated earlier, the present invention may be applied to water turbines. These turbines can be placed in shallow waters with regular ocean currents or significant tidal water motions, such as found as in bays, inlets, and so forth. In deep water, the vertical axis of the turbine structure may not be able to be secured to the bottom. In such cases, a structure such as shown in FIG. 14A where a platform 50 floating on the water surface 54 is anchored to the bottom by lines 53 and a foil cage assembly 51 is suspended from the platform 50 into the water. A fixed central rod 52 around which the foil cage assembly 51 rotates, is fixed to the platform 50. In this embodiment of the present invention, a catamaran boat structure is used for the platform 50 upon which the electric generators and servicing structures 55 are mounted A variation is illustrated in FIG. 14B in which a ballast tank 56 adds more stability to the turbine system. The ballast tank 56 rides on the water surface when empty to be towed into position. Then the tank 56 is flooded to sink to the desired depth. The tank 54 not only shortens and stabilizes the anchor lines 53 to the platform 50, but also provides a second fixed point 57 for the central stationary rod 52 around which the foil cage assembly 51 rotates.

Thus the present invention provides for turbines which are highly efficient, and relatively easy to design, manufacture, install, and maintain compared to conventional wind and water turbines. Other advantages are perhaps more subtle. The smaller size of a turbine of the present invention decreases the likelihood of aesthetic objections as compared to a conventional wind turbine with equal energy conversion capacity. Furthermore, the compact appearance of the rotating foils allows birds to better avoid the turbine, a principal objection to the turbines of current windfarms.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A turbine for generating energy from a fluid flow, comprising:
    a central axis;
    a plurality of foils rotatable about said central axis;
    each of said foils having a length and a foil axis parallel to said length and said central axis, each of said foils rotatable about its foil axis and assuming an attack angle to a direction of said fluid flow responsive to a velocity and direction of said fluid flow, the angular location and velocity of said foil as said foil rotates about said central axis, said attack angle dynamically controlled about said foil axis as said foil rotates about said central axis so as to maximize said foil's moment about said central axis.

2. The turbine of claim 1 further comprising at least one sensor adapted to determine a speed and direction of said fluid flow with respect to said turbine.

3. The turbine of claim 1 wherein each of said foils has a cross-section perpendicular to said length of said foil, wherein said cross-section comprises a uniform cross-section.

4. The turbine of claim 3 wherein each of said foils has a cross-section perpendicular to said length of said foil, said cross-section symmetric with respect to a chord of said cross-section.

5. The turbine of claim 4 wherein said attack angle for each foil is positive for one-half of said foil rotation about said central axis and negative for a remaining half of said foil rotation about said central axis.

6. The turbine of claim 3 wherein each of said foils comprise one or more high lift devices, said one or more high-lift devices dynamically changing said cross-section of said foil to increase said foil's moment about said central axis.

7. The turbine of claim 6 wherein said one or more high lift devices comprise leading edge slats.

8. The turbine of claim 6 wherein said one or more high lift devices comprise trailing edge flaps.

9. The turbine of claim 1 wherein said plurality of foils comprises at least three foils.

10. The turbine of claim 1 wherein each of said foils comprise a rod of dense material located within said foil so that a center of gravity of said foil substantially coincides with a center of pressure of said foil.

11. The turbine of claim 10 wherein said rod of dense material substantially neutralizes buoyancy of said foil in water when said turbine is operated under water.

12. A method of operating a turbine to generate energy from a fluid flow, said turbine having a plurality of foils rotatable about a central axis, each of said foils having a length and a foil axis parallel to said length and said central axis, each of said foils rotatable about its foil axis, said method comprising:
    dynamically controlling an attack angle of each foil to said direction of fluid flow about said foil axis responsive to a velocity and direction of said fluid flow, the angular location and velocity of said foil as said foil rotates about said central axis so as to maximize said foil's moment about said central axis.

13. The method of claim 12 further comprising determining a speed and direction of said fluid flow with respect to said turbine.

14. The method of claim 13 comprising performing said speed and direction determining step with at least three fluid flow sensors and disposing said at least three fluid flow sensors symmetrically about and displaced from said central axis.

15. The method of claim 12 wherein in said dynamically controlling step, controlling positive attack angles for each foil for one-half of said foil rotation about said central axis and negative attack angles for a remaining half of said foil rotation about said central axis.

16. The method of claim 12 wherein said foil defining step further includes dynamically changing said cross-section of each of said foils to increase said foil's moment about said central axis.

17. The turbine of claim 16 wherein said cross-section changing step comprises changing a leading edge of each of said foils.

18. The turbine of claim 16 wherein said cross-section changing step comprises changing a trailing edge of each of said foils.

19. The method of claim 12 further comprising defining at least three foils for said plurality of foils.

20. The method of claim 12 further comprising fixing a rod of dense material in each of said foils so that a center of gravity of said foil substantially coincides with a center of pressure of said foil.

21. The turbine of claim 20 wherein said rod of dense material substantially neutralizes buoyancy of said foil in water when said turbine is operated under water.

22. A turbine for generating energy from a fluid flow, comprising:
    a central axis;
    a plurality of foils rotatable about said central axis, each of said foils having a length and a foil axis parallel to said length and said central axis, each of said foils rotatable about its foil axis; and
    means for dynamically controlling an attack angle of each foil to a direction of fluid flow about said foil axis responsive to a velocity and direction of said fluid flow, the angular location and velocity of said foil as said foil rotates about said central axis so as to maximize said foil's moment about said central axis.

23. The turbine of claim 22 wherein said attack angle of each foil assumes positive attack angles for one-half of said foil rotation about said central axis and negative attack angles for a remaining half of said foil rotation about said central axis.

24. The turbine of claim 23 wherein each foil comprises a symmetric cross-section with respect to a chord of said cross-section.

25. The turbine of claim 22 wherein each of said foils has a cross-section perpendicular to said length of said foil, wherein said cross-section comprises a uniform cross-section.

26. The turbine of claim 22 wherein each foil has a density corresponding to said fluid.

* * * * *